(12) United States Patent
Lee et al.

(10) Patent No.: US 11,140,522 B2
(45) Date of Patent: Oct. 5, 2021

(54) METHOD AND ELECTRONIC DEVICE FOR TRANSMITTING GROUP MESSAGE

(71) Applicant: SAMSUNG ELECTRONICS CO., LTD., Suwon-si (KR)

(72) Inventors: Seungcheol Lee, Suwon-si (KR); Inyoung Choi, Suwon-si (KR); Jongsung Joo, Suwon-si (KR); Jehyun Lee, Suwon-si (KR); Kiho Cho, Suwon-si (KR); Hyoungtak Cho, Suwon-si (KR); Areum Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/741,965

(22) Filed: Jan. 14, 2020

(65) Prior Publication Data

US 2020/0245103 A1 Jul. 30, 2020

(30) Foreign Application Priority Data

Jan. 30, 2019 (KR) .................. 10-2019-0011955

(51) Int. Cl.
*H04W 4/06* (2009.01)
*H04W 4/44* (2018.01)

(52) U.S. Cl.
CPC ............... *H04W 4/06* (2013.01); *H04W 4/44* (2018.02)

(58) Field of Classification Search
CPC .................. H04W 4/06; H04W 4/44
(Continued)

(56) References Cited

U.S. PATENT DOCUMENTS 10,101,745 B1 * 10/2018 Sun .................... G06Q 10/047
2013/0102352 A1    4/2013 Mintah et al.
(Continued)

FOREIGN PATENT DOCUMENTS

KR          10-1475040        12/2014
KR       10-2016-0029323       3/2016
(Continued)

OTHER PUBLICATIONS

International Search Report dated Apr. 27, 2020 in counterpart International Patent Application No. PCT/KR2020/000607.

*Primary Examiner* — Tan H Trinh
(74) *Attorney, Agent, or Firm* — Nixon & Vanderhye P.C.

(57) ABSTRACT

An electronic device includes wireless communication circuitry configured to perform wireless communication with at least one external electronic device, a sensor configured to obtain information related to the electronic device, a processor operatively coupled to the wireless communication circuitry and the sensor, and a memory operatively coupled to the processor. The memory may store instructions, which upon execution, enable the processor to control the electronic device to: obtain first information comprising information obtained through the sensor and information on a user of the electronic device, obtain second information for the at least one external electronic device from the at least one external electronic device through the wireless communication circuitry, generate at least one group based on at least one piece of criterion information based on the obtained first information and the obtained second information, and group the at least one external electronic device based on the generated at least one group.

20 Claims, 19 Drawing Sheets

(58) Field of Classification Search
USPC .............. 455/518–519, 41.1, 41.2, 30.2
See application file for complete search history.

(56) References Cited

U.S. PATENT DOCUMENTS

| | | | |
|---|---|---|---|
| 2014/0204824 A1* | 7/2014 | Chen ..................... | H04W 4/06 370/312 |
| 2014/0302774 A1* | 10/2014 | Burke .................... | H04W 4/08 455/3.05 |
| 2016/0007138 A1* | 1/2016 | Palanisamy ............ | H04W 4/50 455/41.2 |
| 2016/0212596 A1 | 7/2016 | Brahmi et al. | |
| 2016/0267796 A1 | 9/2016 | Hiroma et al. | |
| 2016/0323233 A1* | 11/2016 | Song .................... | G08G 1/0141 |
| 2016/0381538 A1 | 12/2016 | Tan et al. | |
| 2017/0113664 A1* | 4/2017 | Nix ..................... | B60T 8/17558 |
| 2017/0288886 A1* | 10/2017 | Atarius ............... | H04L 65/1063 |
| 2017/0303096 A1* | 10/2017 | Masuda ................. | H04W 4/08 |
| 2018/0288588 A1* | 10/2018 | Uchiyama .............. | H04W 4/38 |
| 2018/0295628 A1* | 10/2018 | Lu ....................... | H04L 5/0058 |
| 2019/0090099 A1* | 3/2019 | Wang .................... | H04W 76/40 |
| 2019/0158992 A1* | 5/2019 | Lee ....................... | H04L 1/0009 |
| 2019/0174344 A1* | 6/2019 | Karelia ................. | H04L 43/062 |
| 2019/0239118 A1* | 8/2019 | Baghel .................. | H04L 69/08 |
| 2019/0268420 A1* | 8/2019 | Acharya ................ | H04L 45/74 |
| 2019/0288827 A1* | 9/2019 | Hu ........................ | H04L 5/0012 |
| 2020/0084592 A1* | 3/2020 | Gulati ................... | H04W 4/40 |
| 2020/0100048 A1* | 3/2020 | Wu ........................ | H04W 4/02 |
| 2020/0120458 A1* | 4/2020 | Aldana ................. | H04W 28/22 |
| 2020/0228946 A1* | 7/2020 | Hwang ................. | H04W 4/12 |
| 2020/0245109 A1* | 7/2020 | Yang ..................... | H04W 4/12 |
| 2020/0275244 A1* | 8/2020 | Lee ....................... | H04W 4/40 |
| 2020/0288288 A1* | 9/2020 | Lee ....................... | H04W 4/40 |
| 2020/0305167 A1* | 9/2020 | Freda .................... | H04L 1/1642 |
| 2020/0374053 A1* | 11/2020 | Hwang ................. | H04L 67/12 |
| 2020/0404456 A1* | 12/2020 | Byun ..................... | H04W 4/06 |

FOREIGN PATENT DOCUMENTS

| | | |
|---|---|---|
| WO | 2010/098554 | 9/2010 |
| WO | 2015/032436 | 3/2015 |

* cited by examiner

FIG. 5B

| 541 | id | Sec Mark | lat | long | speed | heading | ... |

| 543 | id | Sec Mark | lat | long | speed | heading | ... |

| 545 | RELATIVE DISTANCE | RELATIVE VELOCITY | RELATIVE ACCELERATION | TYPE OF VEHICLE | HEADING | STATUS |

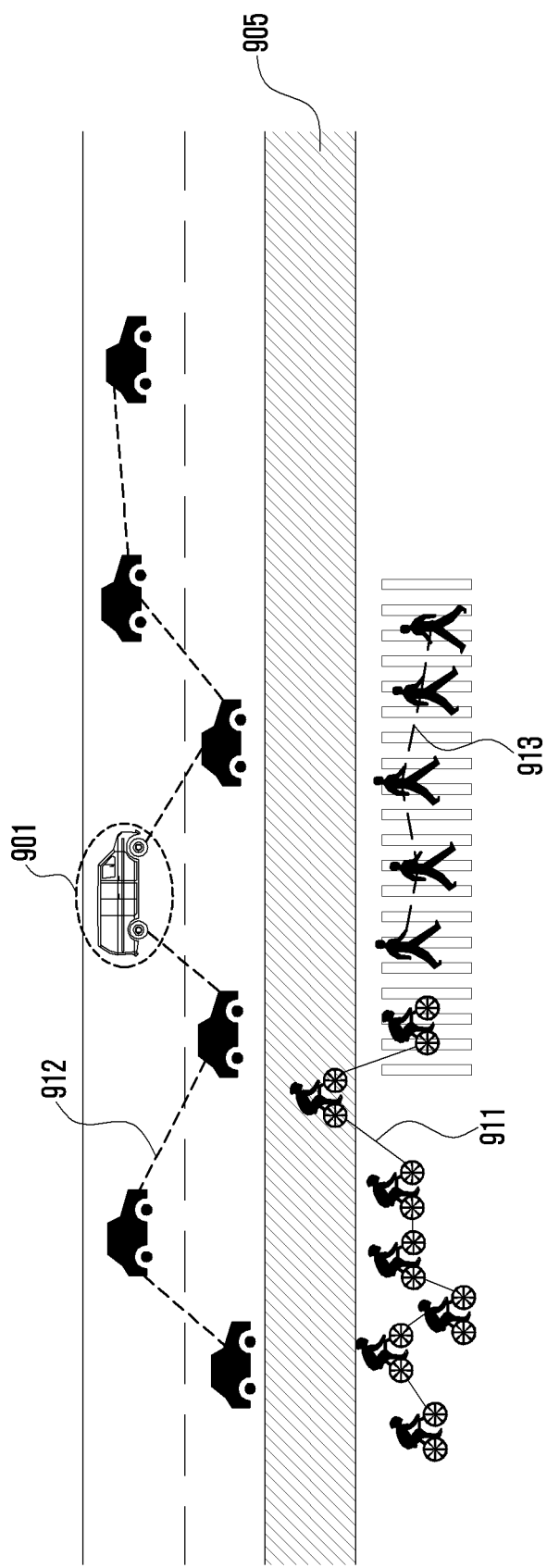

METHOD AND ELECTRONIC DEVICE FOR TRANSMITTING GROUP MESSAGE

CROSS-REFERENCE TO RELATED APPLICATION

This application is based on and claims priority under 35 U.S.C. § 119 to Korean patent application number 10-2019-0011955, filed on Jan. 30, 2019, in the Korean Intellectual Property Office, the disclosure of which is incorporated by reference herein in its entirety.

BACKGROUND

Field

The disclosure relates to a method and electronic device for grouping external electronic devices based, for example, on a vehicle to everything (V2X) technology and transmitting a group message to the group.

Description of Related Art

Wireless networking (e.g., vehicle to everything (V2X)) in a vehicle may be a technology in which a vehicle exchanges information with another external electronic device (e.g., another vehicle, mobile device or base station) over a wired or wireless communication network. Wireless networking in a vehicle may be divided into vehicle to infrastructure (V2I), vehicle to vehicle (V2V), vehicle to nomadic device (V2N) and/or vehicle to pedestrian (V2P). For example, in V2V, vehicles may exchange information. In V2I, vehicle running information may be exchanged through a base station installed on a road. A wireless networking technology (e.g., V2X technology) in a vehicle is a technology for performing mutual communication in real time, and may collectively refer to communication between a vehicle and a vehicle and communication between a vehicle and a thing. In the V2X technology, vehicles may exchange surrounding traffic information (e.g., the present traffic condition, an accident situation, access notification or a collision warning for a vehicle). Information related to a vehicle may be provided to a user.

Recently, a traffic system is grafted onto the development of the wireless communication technology, enabling various intelligent technology-added services. An electronic device may provide intelligent technology-added services to a user by exchanging multimedia data, such as moving images or images with an external electronic device.

In general, the V2X technology corresponds to a method of transmitting data to all external electronic devices (e.g., other electronic devices) located within a set range. It may be difficult for a vehicle (e.g., electronic device) to which the V2X technology has been applied to transmit desired data to only a given group or a given external electronic device. Particularly, if a vehicle to which the V2X technology has been applied is running, it may be difficult for the vehicle to select or directly designate a given group and to transmit a group message to only the given group.

SUMMARY

According to various embodiments of the disclosure, a vehicle to which V2X technology has been applied may provide at least one group based on the state of a running external electronic device, may select one of the generated at least one group, and may transmit a group message to the selected one group.

According to various example embodiments of the disclosure, an electronic device includes: wireless communication circuitry configured to perform wireless communication with at least one external electronic device, a sensor configured to obtain information related to the electronic device, a processor operatively coupled to the wireless communication circuitry and the sensor, and a memory operatively coupled to the processor. The memory may be configured to store instructions, which upon execution, enable the processor to control the electronic device to: obtain first information comprising information obtained through the sensor and information on a user of the electronic device, obtain second information for the at least one external electronic device from the at least one external electronic device through the wireless communication circuitry, generate at least one group based on at least one piece of criterion information based on the obtained first information and the obtained second information, and group the at least one external electronic device based on the generated at least one group.

According to various example embodiments of the disclosure, an electronic device includes: wireless communication circuitry configured to perform wireless communication with at least one external electronic device, a display, a processor operatively coupled to the wireless communication circuitry and the display, and a memory operatively coupled to the processor. The memory may store instructions, which upon execution, enable the processor to control the electronic device to: transmit, to the at least one external electronic device, information on a user stored in the memory using the wireless communication circuitry, obtain, from the at least one external electronic device, at least one group message based on a vehicle to everything (V2X) technology, identify whether the electronic device is included as a group member list in the group message, and display the obtained at least one group message on the display based on a result of the identification.

According to various example embodiments of the disclosure, a grouping method may include: obtaining first information comprising information on an electronic device obtained through a sensor and information on a user of the electronic device, obtaining second information for at least one external electronic device from the at least one external electronic device through wireless communication circuitry of the electronic device, generating at least one group based on at least one piece of criterion information based on the obtained first information and the obtained second information, and grouping the at least one external electronic device based on the generated at least one group.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 5B is a diagram illustrating an example method of generating a group according to various embodiments;

FIG. 9A is a diagram illustrating an example method of generating a group based on a given criterion according to various embodiments;

DETAILED DESCRIPTION

Hereinafter, various example embodiments of the disclosure will be described in greater detail with reference to accompanying drawings.

Figure 1:
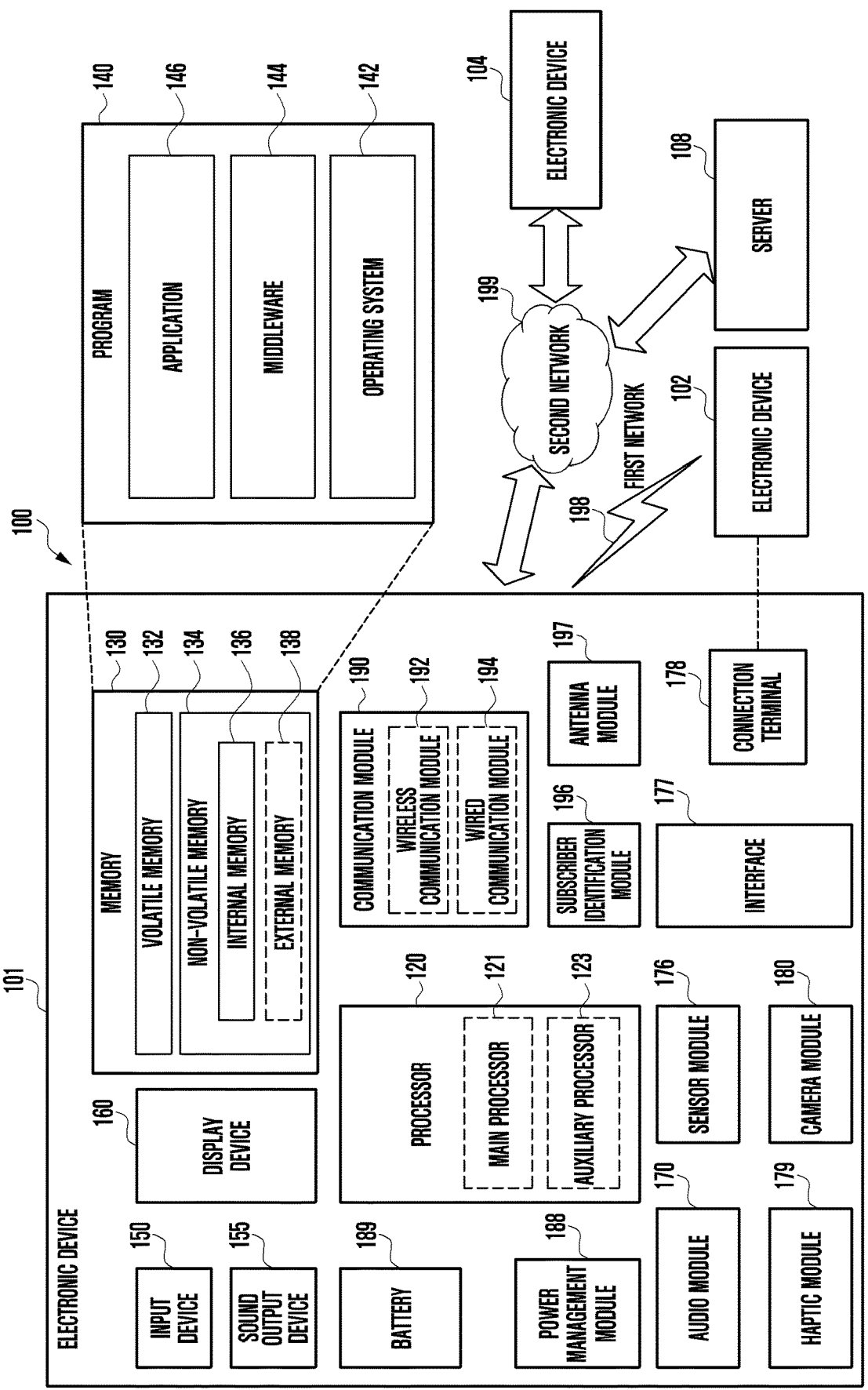
FIG. 1 is a block diagram illustrating an example electronic device within a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 over a first network 198 (e.g., a short-range wireless communication network), or an electronic device 104 or a server 108 over a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various types of data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one (e.g., the display device 160, the sensor module 176, or the communication module 190) of the components of the electronic device 101, instead of the main processor 121 while the main processor 121 is in an inactive (e.g., sleep) state, or along with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 (e.g., DRAM, SRAM or SDRAM) may include the volatile memory 132 or the non-volatile memory 134.

The program 140 may be stored in the memory 130 as software, and may include, for example, an operating system (OS) 142, middleware 144, or an application 146 (e.g., application program).

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., in a wired way) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor, for example.

The interface 177 may support one or more specified protocols to be used for the electronic device 101 to be coupled with the external electronic device (e.g., the electronic device 102) directly (e.g., in a wired way) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service.

The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., in a wired way), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
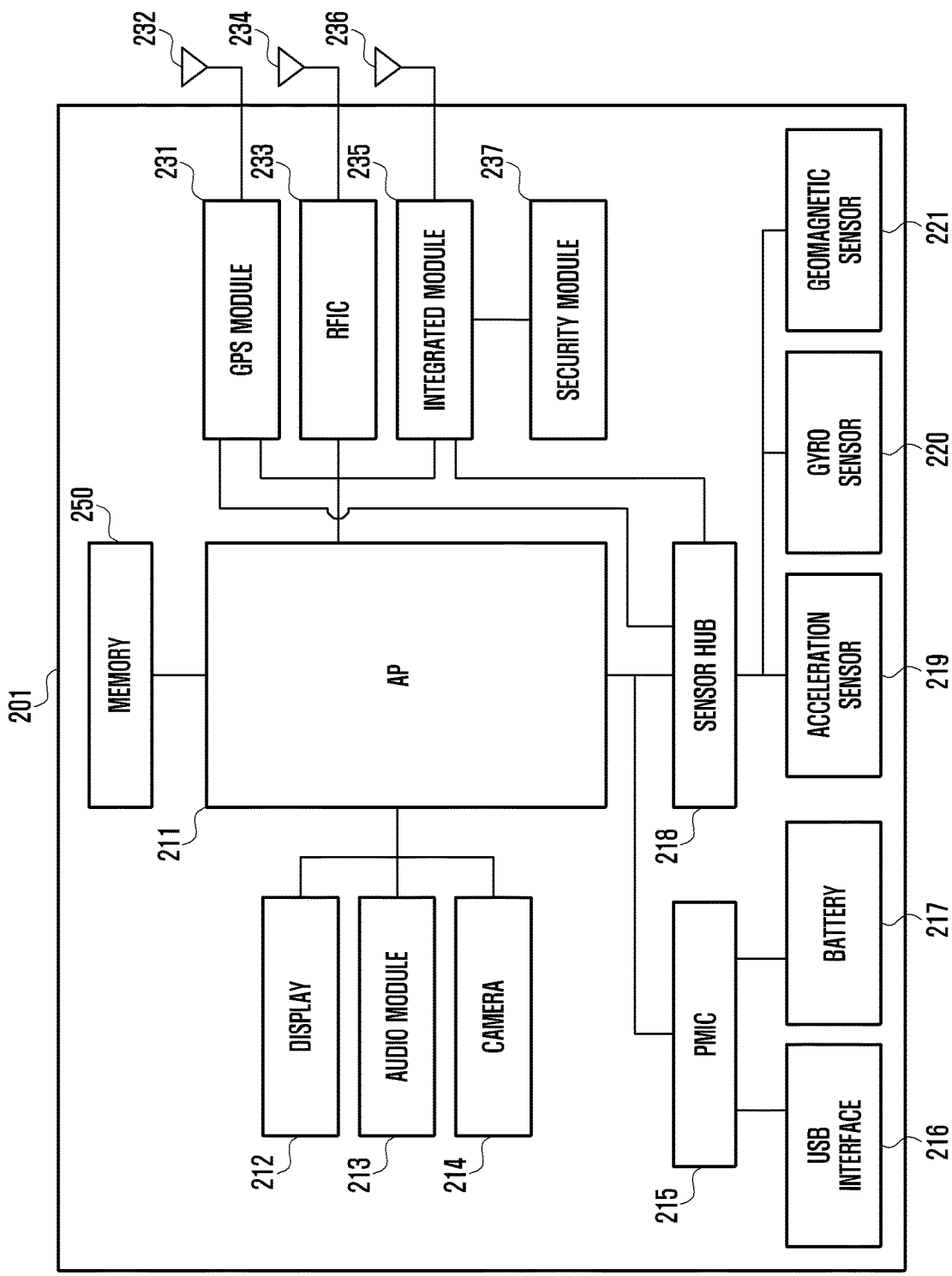
FIG. 2A is a block diagram illustrating an example electronic device according to various embodiments.
Figure 2B:
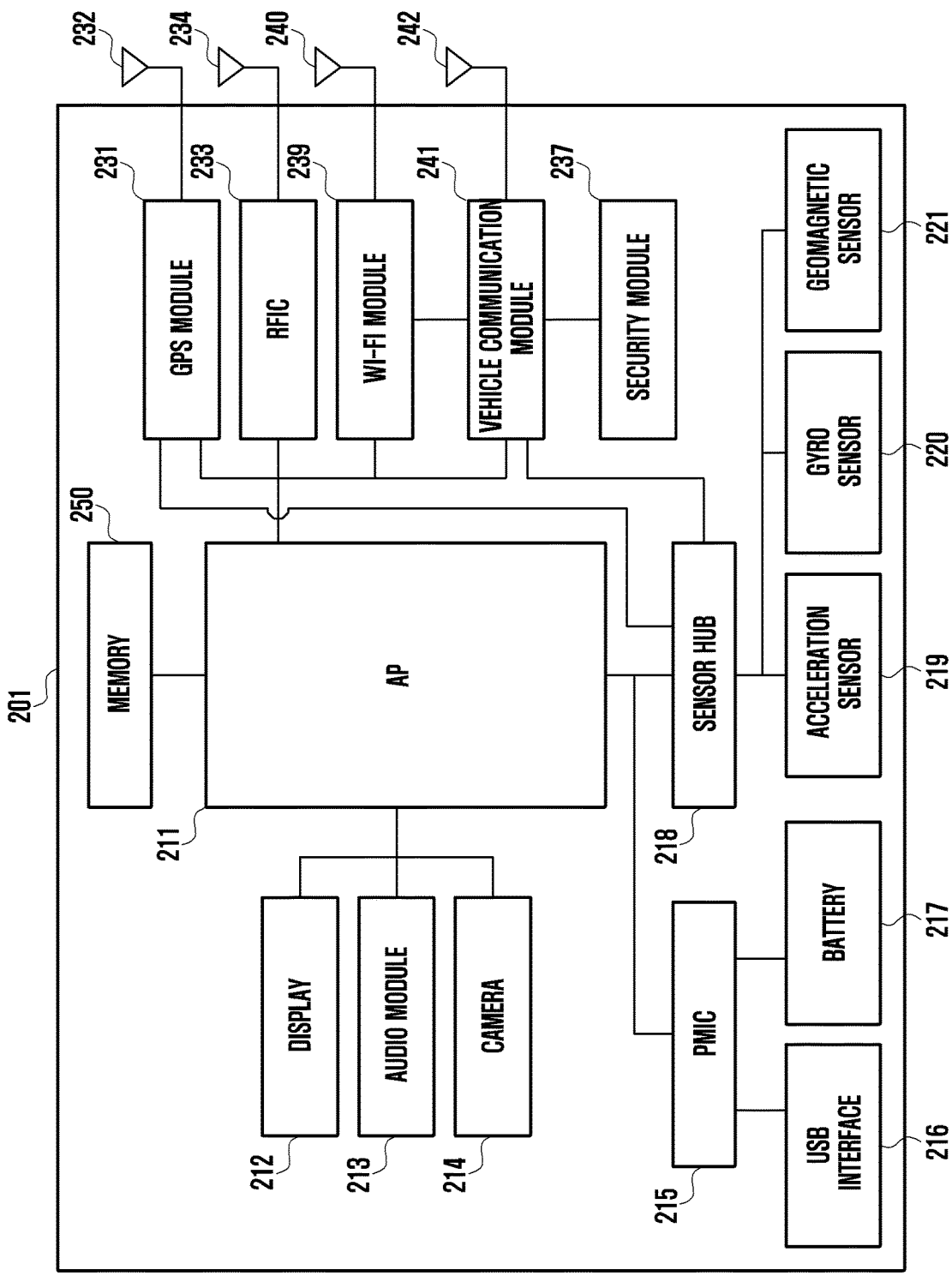
FIG. 2B is a block diagram illustrating an example electronic device according to various embodiments.

FIG. 2A is a block diagram illustrating an example electronic device according to various embodiments, and FIG. 2B is a block diagram illustrating an example electronic device according to various embodiments.

Referring to FIG. 2A, the electronic device 201 (e.g., the electronic device 101 in FIG. 1) may include an application processor (AP) (e.g., including processing circuitry) 211, a display 212, an audio module (e.g., including audio circuitry) 213, a camera 214, a PMIC 215, a USB interface (e.g., including USB interface circuitry) 216, a battery 217, a sensor hub 218, an acceleration sensor 219, a gyro sensor 220, a geomagnetic sensor 221, a GPS module (e.g., including GPS circuitry) 231, an antenna for GPS 232, a radio-frequency integrated circuit (RFIC) 233, an antenna for RFIC 234, an integrated module (e.g., including processing circuitry) 235, an antenna for integrated module 236, a security module (e.g., including a secure storage) 237 and a memory 250.

The AP 211 (e.g., the main processor 121 in FIG. 1) may include various processing circuitry and control an overall operation of the electronic device 201. For example, when an instruction stored in the memory 250 (e.g., the memory 130 in FIG. 1) is executed, the AP 211 may control at least one piece of hardware to perform an operation corresponding to the instruction. The AP 211 may have any one of a sleep state or an auto-activation (or wake-up) state. In the sleep state, the AP 211 may not perform any operation, and thus the consumption of power by the AP 211 may be reduced. The AP 211 may switch to the wake-up state or any one of various states of the electronic device 201 using various conditions as triggers. The various states may be associated with, for example, and without limitation, at least one of transmission or reception based on at least one of a personal safety message (PSM) or a basic safety message (BSM), or the like. In the wake-up state, the AP 211 may operate in response to an instruction stored in the memory 250. The AP 211 may include various types of information, such as, for example, and without limitation, data obtained from various sensors, such as the acceleration sensor 219, the gyro sensor 220 or the geomagnetic sensor 221, data obtained from the GPS module 231, the results of analysis of an image obtained from the camera 214, or the like. The AP 211 may control the integrated module 235 and the antenna for integrated module 235 to transmit a communication signal including the obtained information. Although not illustrated, a front end module (FEM) may be connected between the integrated module 235 and the antenna for integrated module 236.

The integrated module 235 may include various processing circuitry and may be implemented as a chipset capable of performing both data processing for Wi-Fi and data (e.g., data for WAVE) processing associated with vehicle safety. For example, the integrated module 235 may be implemented as a chipset fabricated to process data according to IEEE 802.11 a/b/n/p. Furthermore, the antenna for integrated module 236 may perform the transmission and reception of a communication signal for Wi-Fi and the transmission and reception of a communication signal (e.g., communication signal for WAVE) associated with vehicle safety. For example, the communication signal for Wi-Fi may use a frequency band having a center frequency of 5 GHz. The communication signal for WAVE may use a frequency band having a center frequency of 5.8 GHz, which has a smaller difference than the frequency band for Wi-Fi. Accordingly, the antenna for integrated module 236 may perform both the transmission and reception of the two communication signals. The antenna for integrated module 236 has been illustrated as being one antenna, but this is merely illustrative. The antenna for integrated module 236 may be implemented as a plurality of antennas as required by a communication standard.

Information necessary for data processing for WAVE may be stored in the security module 237. The integrated module 235 may process data for WAVE using the stored information. For example, various types of information, such as information used for WAVE modulation/demodulation, information used for encryption/decryption, or information used to process a message, may be stored in the security module 237. The security module 237 may include a secure storage and may be directly or indirectly accessed by the integrated module 235, the AP 211 or the sensor hub 218. In some implementations, the security module 237 may be integrated with the memory 250 or may be implemented as different hardware.

The integrated module 235 may obtain data from the AP 211, may generate an electrical signal corresponding to a communication signal for WAVE by processing the data, and may provide the generated electrical signal through the antenna for integrated module 236. The integrated module 235 may obtain data from the sensor hub 218, may generate an electrical signal corresponding to a communication signal for WAVE by processing the data, and may provide the generated electrical signal through the antenna for integrated module 236. For example, if the state of the AP 211 is the wake-up state, the integrated module 235 may obtain data from at least one of the AP 211 or the sensor hub 218. If the state of the AP 211 is the sleep state, the integrated module 235 may obtain data from the sensor hub 218. The sensor hub 218 (e.g., the auxiliary processor 123) may include at least one of a processing circuitry capable of obtaining data from at least one of sensors (e.g., the acceleration sensor 219, the gyro sensor 220 or the geomagnetic sensor 221) or the GPS module 231 and processing the data or a storage circuitry capable of storing the data transiently or non-transiently.

The integrated module 235 may include at least one of a processing circuitry capable of processing a communication signal for WAVE, a transmission circuitry capable of transmitting the communication signal, or a reception circuitry capable of obtaining a communication signal. The integrated module 235 may scan a communication signal in a given cycle in order to obtain the communication signal, may analyze the communication signal, and may operate although the state of the AP 211 is the sleep state. The integrated module 235 may receive a communication signal, and may wake up the AP 211 if data included in the communication signal satisfies a given condition. In a common Wi-Fi operation, if the state of the AP 211 is the sleep state, the integrated module 235 may wake up the AP 211 if a communication signal is received from an access point that has been previously connected or that has a given condition. Information on the access point that has been previously connected or that has a given condition may be updated. Accordingly, information of the storage of the integrated module 235 may be changed by the AP 211 if the information on the access point needs to be updated. The integrated module 235 may operate based on the changed information.

The integrated module 235 may include transmission circuitry for transmitting a communication signal and reception circuitry for processing a communication signal from an external electronic device. The electronic device 201 may selectively enable the transmission circuitry or the reception circuitry. For example, the transmission circuitry may be disabled and the reception circuitry may be enabled so that a communication signal is not transmitted and a communication signal from another entity is scanned. In this disclosure, a given module (e.g., the integrated module 235 or a vehicle communication module 241 in FIG. 2B) for performing communication may also be referred to, for example, as communication circuitry.

The AP 211 or the sensor hub 218 may identify a current location of the electronic device 201. If the electronic device 201 is identified to be located outside a means of transportation (e.g., vehicle), the AP 211 or the sensor hub 218 may enable the transmission circuitry of the integrated module 235 in response thereto, and may control the transmission circuitry to transmit a communication signal including data obtained through the enabled transmission circuitry (e.g., a communication signal including a PSM). The AP 211 or the sensor hub 218 may control the electronic device 201 to transmit a communication signal using at least some of geographical information for a given area. For example, when the electronic device 201 enters a given area, it may obtain geographical information for the given area through a base station on the roadside or a server, and may store the information in the memory 250. In various embodiments of the disclosure, the memory 250 may store information for a danger area. According to various embodiments of the disclosure, geographical information may be data that is related to at least one of a given latitude, longitude or altitude and that is represented as a numerical value or may be data of an image form. If location information of the electronic device 201 identified through the GPS module 231 is identified to belong to a given location (e.g., danger area), the AP 211 or the sensor hub 218 may control the integrated module 235 to transmit a communication signal.

If the state of the AP 211 is the sleep state, the sensor hub 218 may obtain at least some of geographical information for a given area from the memory 250, may store the geographical information, and may compare the stored geographical information with the current location of the electronic device 201 identified through the GPS module 231. The sensor hub 218 may determine whether to transmit a communication signal based on a result of the comparison.

The display 212 (e.g., the display 160) may display various graphic objects (e.g., graphic user interface (GUI)) associated with vehicle safety. In various embodiments of the disclosure, the display 212 may display a graphic object capable of enabling whether to transmit and receive communication signals for WAVE. The AP 211 may transmit and receive communication signals for WAVE in response to an input, e.g., an input from a user. According to an example embodiment, the audio module 213 (e.g., the audio module 170) may include various audio circuitry and output a vehicle-related warning voice. The camera 214 (e.g., the camera module 180) may capture an image. The AP 211 may identify whether to transmit and receive communication signals for WAVE using an image obtained from the camera 214. The PMIC 215 (e.g., power management module 188) may supply at least one of a voltage or current of power from the battery 217 (e.g., the battery 189) by controlling the voltage or current to a numerical value suitable for each piece of hardware. A cable of wired power transmission may be connected through the USB interface 216 (e.g., the interface 177). The electronic device 201 may obtain power through the USB interface 216 (e.g., the interface 177). The RFIC 233 may be implemented as a chipset for data communication, for example. The RFIC 233 may generate an electrical signal, corresponding to a signal for data communication, based on data from the AP 211, and may provide the electrical signal to the antenna for RFIC 234. The acceleration sensor 219 may identify the acceleration of the electronic device 201. The gyro sensor 220 may identify rotation information. The geomagnetic sensor 221 may identify geomagnetic information.

The AP 211 or the sensor hub 218 may include information in a communication signal (e.g., a communication signal including a PSM) to be transmitted through the integrated module 235 using data from various types of sensors (e.g., the acceleration sensor 219, the gyro sensor 220 or the geomagnetic sensor 221) or the GPS module 231. In various embodiments of the disclosure, the electronic device 201 may not include the sensor hub 218. In this case, the AP 211 may be always in the wake-up state or may periodically wake up and identify whether to transmit a communication signal.

In various embodiments of the disclosure, the AP 211 or the sensor hub 218 may execute a vulnerable road user (VRU) safety application. The VRU safety application may be an application capable of generating the BSM or PSM. The VRU safety application may identify the location, heading, speed or time of the electronic device 201 or a relative location for other entities based on at least some of data from the GPS module 231, data obtained from a BLE positioning system, or data collected from various sensors (e.g., the acceleration sensor 219, the gyro sensor 220 or the geomagnetic sensor 221). The VRU safety application may generate a PSM in response to a detected event or may identify timing in which a corresponding PSM is transmitted.

In various embodiments of the disclosure, the AP 211 or the sensor hub 218 may select any one of various states of the electronic device 201, and may identify the transmission or reception mode of a PSM or BSM in response to the selected state. The AP 211 or the sensor hub 218 may control the transmission and reception mode of the integrated module 235 (or the vehicle communication module 241 in FIG. 2B) based on the identified transmission or reception mode.

FIG. 2B is a block diagram illustrating an example electronic device according to various embodiments. The electronic device 201 according to an example embodiment of FIG. 2B may include a Wi-Fi module (e.g., including Wi-Fi circuitry) 239 and a vehicle communication module (e.g., including communication circuitry) 241 instead of the integrated module 235 of FIG. 2A. The Wi-Fi module 239 may be implemented as a chipset including circuitry capable of performing Wi-Fi communication. The vehicle communication module 241 may be implemented as a chipset including various communication circuitry capable of performing WAVE communication, for example. The electronic device 201 may transmit and receive communication signals for Wi-Fi through an antenna for Wi-Fi 240 connected to the Wi-Fi module 239. The electronic device 201 may transmit and receive communication signals for WAVE (e.g., a communication signal including a PSM or a communication signal including a BSM), for example, through an antenna for vehicle communication 242 connected to the vehicle communication module 241. The vehicle communication module 241 may further include transmission circuitry and reception circuitry. If the vehicle communication module 241 is implemented according to a WAVE standard, it may also be referred to as a communication module for WAVE. In various embodiments of the disclosure, the vehicle communication module 241 and the Wi-Fi module 239 may be connected to the respective antennas 242 and 240 as in FIG. 2B. In other embodiments, the vehicle communication module 241 and the Wi-Fi module 239 may share an antenna.

Although not illustrated, the electronic device 201 may be implemented as a device having a dongle form. In this case, the electronic device 201 may be implemented in a simple form, including the vehicle communication module 241 and the antenna for vehicle communication 242 and control circuitry for calculation (e.g., a micro controlling unit (MCU), a digital signal processor (DSP), a field-programmable gate array (FPGA), a central processing unit (CPU), or the like), for example. The electronic device 201 may be connected to an external electronic device (e.g., the electronic device 102 or 104 in FIG. 1) in a wired or wireless way. The electronic device 201 may obtain sensor data or data related to a location from the external electronic device, and may transmit a communication signal including the data (e.g., a communication signal including a PSM or a communication signal including a BSM).

Figure 3:
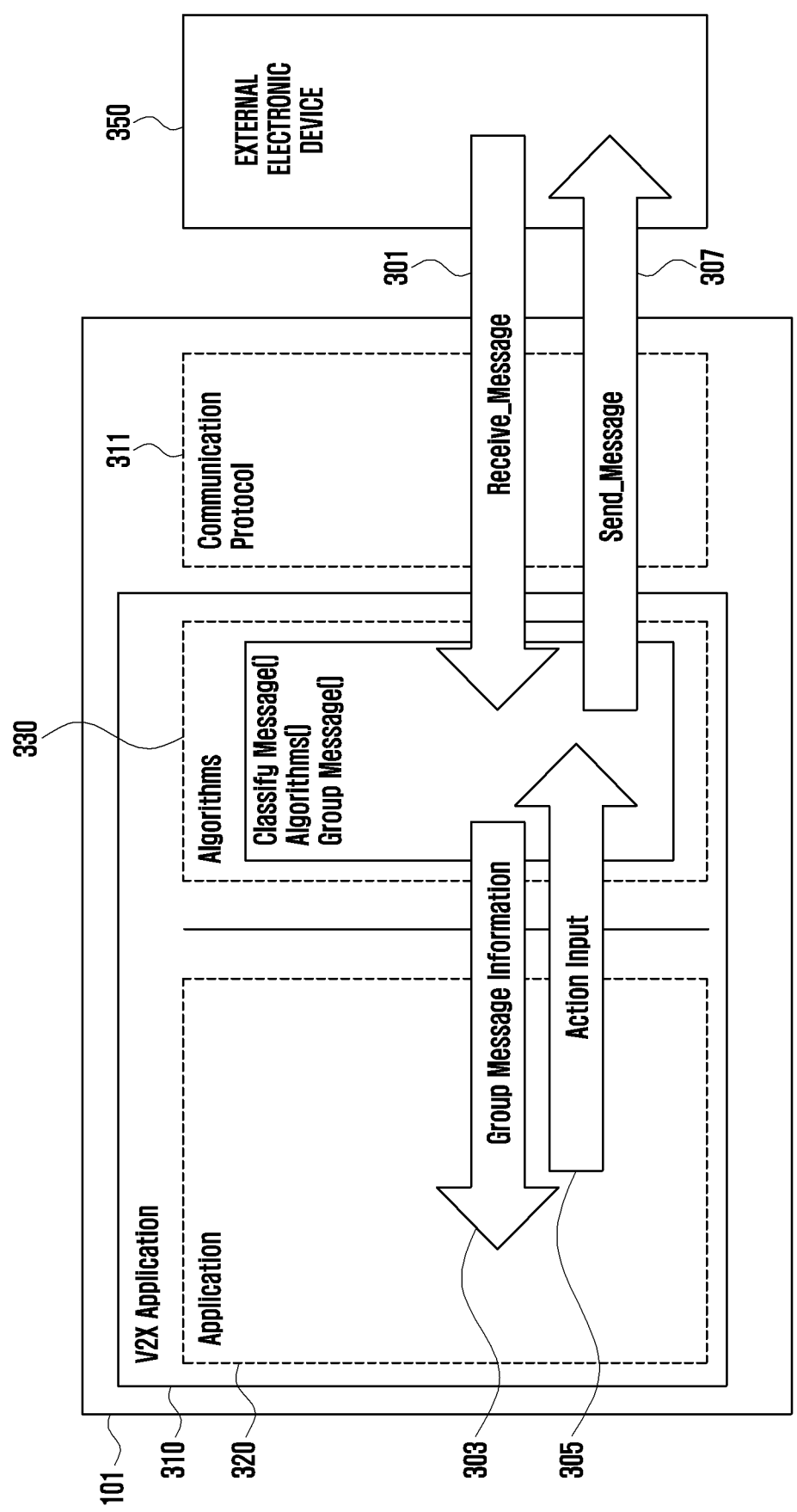
FIG. 3 is a diagram illustrating an example process of processing a group message according to various embodiments.

FIG. 3 is a diagram illustrating an example process of processing a group message according to various embodiments.

Referring to FIG. 3, an electronic device (e.g., the electronic device 101 in FIG. 1) may install a V2X application 310 for performing wireless networking related to the V2X technology along with an external electronic device 350 (e.g., the electronic device 104 in FIG. 1). For example, a processor (e.g., the processor 120 in FIG. 1) of the electronic device 101 may install the V2X application 310 (e.g., the program 140 in FIG. 1) related to wireless networking in a memory (e.g., the memory 130 in FIG. 1). The V2X application 310 may include at least one application 320 (e.g., the application 146 in FIG. 1). The V2X application 310 may include at least one algorithm 330 corresponding to at least one application 320. Hereinafter, the electronic device 101 may include the electronic device of a vehicle to which the V2X technology has been applied. According to an example embodiment, the electronic device 101 may transmit and receive data to the external electronic device 350 (e.g., the electronic device 104 in FIG. 1) through a communication protocol 311 (e.g., standard IEEE 802.11p). For example, the electronic device 101 may communicate with the external electronic device 350 (e.g., another running vehicle, base station or mobile device) while running, and may transmit a message to the external electronic device 350. According to an example embodiment, the electronic device 101 may be a running vehicle. The external electronic device 350 may include, for example, and without limitation, an electronic device embedded in another running vehicle, an electronic device embedded in a bicycle, an electronic device owned by a pedestrian, or the like.

According to an example embodiment, at operation 301, the electronic device 101 may obtain (e.g., receive) a message from the external electronic device 350. For example, the obtained message may be a group message. At operation 303, the electronic device 101 may identify group message information based on the algorithm 330 related to the obtained message.

According to an example embodiment, at operation 305, the electronic device 101 may obtain an input for transmitting a message to the external electronic device 350. For example, the message to be transmitted may be a group message. At operation 307, the electronic device 101 may transmit (e.g., send) the message to the external electronic device 350 based on the algorithm 330 related to the message to be transmitted.

According to various embodiments, a message related to the V2X technology (hereinafter referred to as a "V2X message") may be configured based on a message format, such as, for example, and without limitation, a basic safety message (BSM), a personal safety message (PSM), or the like. The V2X message may include information on the location (e.g., latitude/longitude, speed and/or heading) of the electronic device 101, but is not limited to the information. According to an example embodiment, a standard SAE J2735 DSRC message set that defines a data set included in a V2X message may be configured with 17 messages, 156 data frames, 230 data elements and/or 58 external data elements. The V2X message may include common data elements, such as speedy, heading, latitude, longitude or elevation. According to an example embodiment, the electronic device 101 may obtain a message from the external electronic device 104, and may identify the obtained message using the V2X application 320 and the algorithm 330.

An electronic device (e.g., the electronic device 101 in FIG. 1) according to various example embodiments of the disclosure may include: wireless communication circuitry (e.g., the communication module 190 in FIG. 3) configured to perform wireless communication with at least one external electronic device (e.g., the electronic device 102 or 104 in FIG. 1, the external electronic device 350 in FIG. 3), a sensor (e.g., the sensor module 176 in FIG. 1) configured to obtain information related to the electronic device 101, a processor (e.g., the processor 120 in FIG. 1) operatively coupled to the wireless communication circuitry and the sensor, and a memory (e.g., the memory 130 in FIG. 1) operatively coupled to the processor. The memory may store instructions, which upon execution, enable the processor to control the electronic device to: obtain first information including information obtained through the sensor and information on the user of the electronic device, obtain second information for the at least one external electronic device from the at least one external electronic device through the wireless communication circuitry, generate at least one group based on at least one piece of criterion information based on the obtained first information and the obtained second information, and group the at least one external electronic device based on the generated at least one group.

According to an example embodiment, the processor may be configured to control the electronic device to connect the at least one external electronic device using the wireless communication circuitry based on a vehicle to everything (V2X) technology, and may exchange information related to the V2X technology with the at least one external electronic device.

According to an example embodiment, the at least one piece of criterion information may include at least one of a relative distance, relative velocity or relative acceleration between the electronic device and the at least one external electronic device, and may further include at least one of information on the type, heading or state of a vehicle corresponding to at least one of the electronic device or the at least one external electronic device.

According to an example embodiment, information obtained through the sensor may include at least one of pieces of information of the type, location, speed, acceleration, size or communication state of a vehicle corresponding to the electronic device. Information on the user of the electronic device may include at least one of pieces of information of the age, sex, driving experience or fellow passenger of a vehicle riding in a vehicle.

According to an example embodiment, the electronic device may further include a display (e.g., the display 160 in FIG. 1) operatively coupled to the processor. The processor may control the electronic device to display, on the display, a user interface including at least one of the at least one piece of criterion information, information on the generated at least one group or information on the at least one external electronic device included in the at least one group.

According to an example embodiment, the processor may control the electronic device to detect an input to select one of the at least one group through the user interface, and may transmit at least one message to the selected group in response to the detected input.

According to an example embodiment, the processor may generate at least one message based on a message format based on the V2X technology, and may transmit the at least one message to the at least one external electronic device included in the selected group.

According to an example embodiment, the message format based on the V2X technology may have a form in which a group message frame, including at least one of a group ID, an object ID list, and data, and V2X message optional have been combined.

According to an example embodiment, the at least one message may be a message stored in the memory or may include a message input through the user interface.

According to an example embodiment, the processor 120 may control the electronic device to search for at least one external electronic device to be invited to the at least one group, and may transmit the at least one message for inviting at least some of the retrieved at least one external electronic device to the at least one group.

According to an example embodiment, the processor may control the electronic device to identify whether the generated at least one group includes a plurality of external electronic devices, and may release grouping for the at least one group based on a result of the identification.

According to various example embodiments of the disclosure, an electronic device (e.g., the electronic device 101 in FIG. 1) may include: wireless communication circuitry (e.g., the communication module 190 in FIG. 3) configured to perform wireless communication with at least one external electronic device (e.g., the electronic device 102 or 104 in FIG. 1, the external electronic device 350 in FIG. 3), a display (e.g., the display 160 in FIG. 1), a processor operatively coupled to the wireless communication circuitry and the display, and a memory (e.g., the memory 130 in FIG. 1) operatively coupled to the processor. The memory may store instructions, which upon execution, enable the processor to control the electronic device to: transmit information on a user stored in the memory to the at least one external electronic device using the wireless communication circuitry, obtain at least one group message based on the V2X technology from the at least one external electronic device, identify whether the electronic device is included in the group message as a group member list, and display the obtained at least one group message on the display based on a result of the identification.

According to an example embodiment, the processor may control the electronic device to detect a withdrawal input from a group corresponding to the obtained at least one group message, may transmit a withdrawal request signal for withdrawal from the group based on a V2X technology in response to the withdrawal input, and may filter a group message transmitted by the group.

Figure 4:
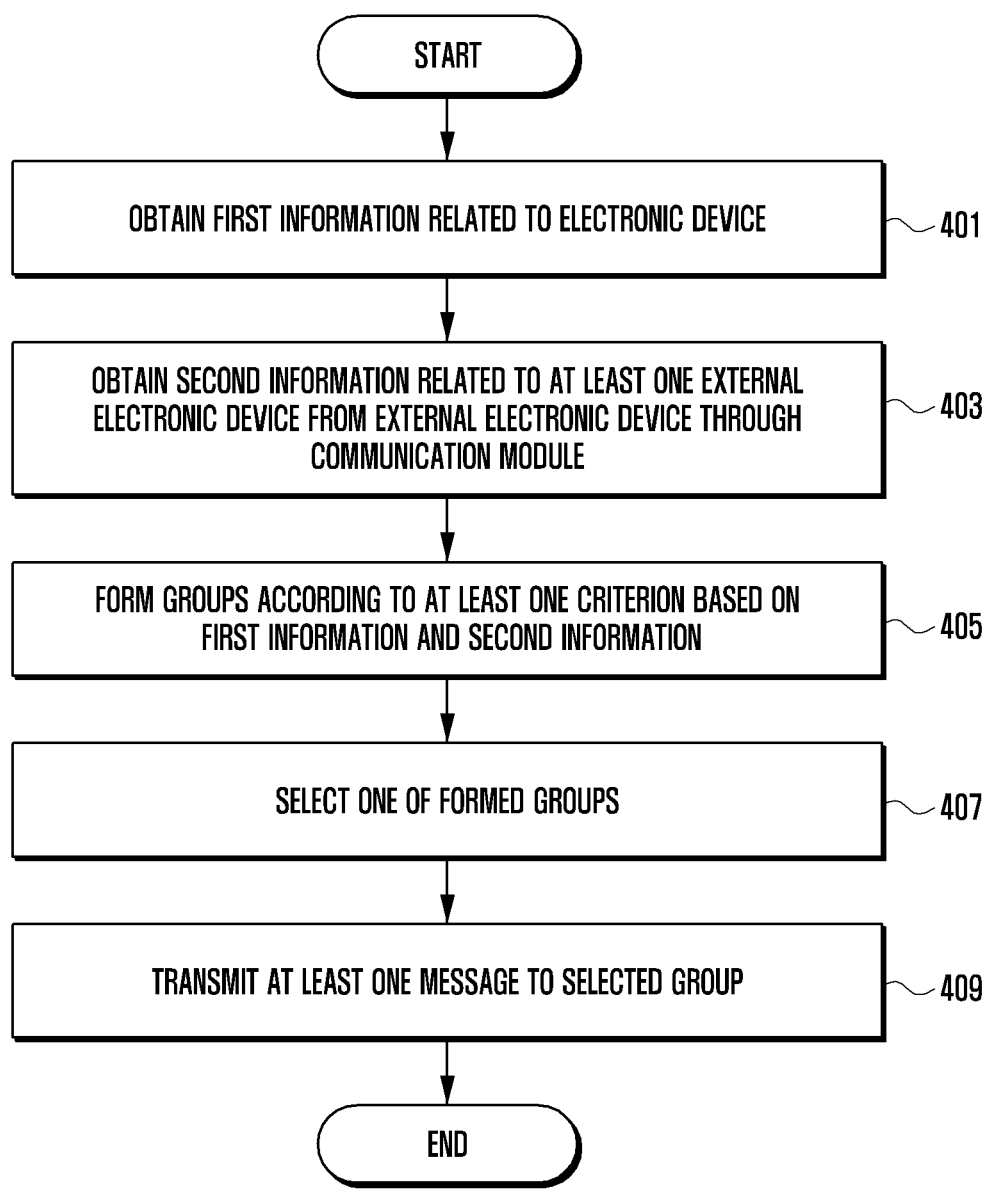
FIG. 4 is a flowchart illustrating an example method of generating a group and transmitting a group message according to various embodiments.

FIG. 4 is a flowchart illustrating an example method of generating a group and transmitting a group message according to various embodiments.

Referring to FIG. 4, at operation 401, a processor (e.g., the processor 120 in FIG. 1) of an electronic device (e.g., the electronic device 101 in FIG. 1) may control the electronic device to obtain first information related to the electronic device 101. For example, the first information may include information related to the V2X technology, and may include at least some of the speed of a vehicle corresponding to the electronic device 101, the location of the vehicle, the heading of the vehicle and/or information (e.g., the age, driving experience or sex of the driver, whether the driver is pregnant or whether a child is on board) related to a driver who drives the vehicle.

At operation 403, the electronic device 101 may obtain second information related to the external electronic device 104 from at least one external electronic device (e.g., the electronic device 104 in FIG. 1) through a communication module (e.g., the communication module 190 in FIG. 3). For example, the second information may include information related to the V2X technology, and may include at least some of the speed, location or heading of the external electronic device 104 (e.g., an electronic device embedded in a vehicle, an electronic device owned by a pedestrian or a base station) and/or information (e.g., the age of a user, or the driving experience or sex of a driver or whether the driver is pregnant in the case of a vehicle) related to the user who uses the external electronic device 104.

At operation 405, the electronic device 101 may form groups according to at least one criterion based on the first information and the second information. For example, the groups may be classified into a vehicle group if the external electronic device 104 corresponds to an electronic device embedded in a vehicle, a pedestrian group if the external electronic device 104 corresponds to an electronic device owned by a pedestrian, and a bicycle group if the external electronic device 104 corresponds to an electronic device embedded in a bicycle, based on the external electronic device 104. Furthermore, the groups may be classified into a male and a female based on the sex of a user who uses the external electronic device 104.

At operation 407, the electronic device 101 may select one of the formed groups. According to an example embodiment, a criterion for selecting a group may be preset by a developer and a user or may be selected based on a user's preference. For example, a group may be set based on the type of means of transportation (e.g., a vehicle, a bicycle or a pedestrian). According to an example embodiment, the electronic device 101 may display, on a screen, a group list corresponding to the formed groups, and may select at least one group in response to a user input.

At operation 409, the electronic device 101 may transmit at least one message to the selected group. For example, the at least one message may have been previously written and stored in a memory (e.g., the memory 130 in FIG. 1), or a message corresponding to a group may have been predetermined. According to an example embodiment, the electronic device 101 may load at least one message, corresponding to the selected group, from the memory 130, and may display the loaded at least one message on a screen. The electronic device 101 may transmit a message, corresponding to a user input, to the selected group based on the at least one message displayed on the screen as a group message. According to an example embodiment, the electronic device 101 may display a keypad for writing a message on a display (e.g., the display 160 in FIG. 1), and may transmit, to the selected group, a message written using the keypad as a group message.

Figure 5A:
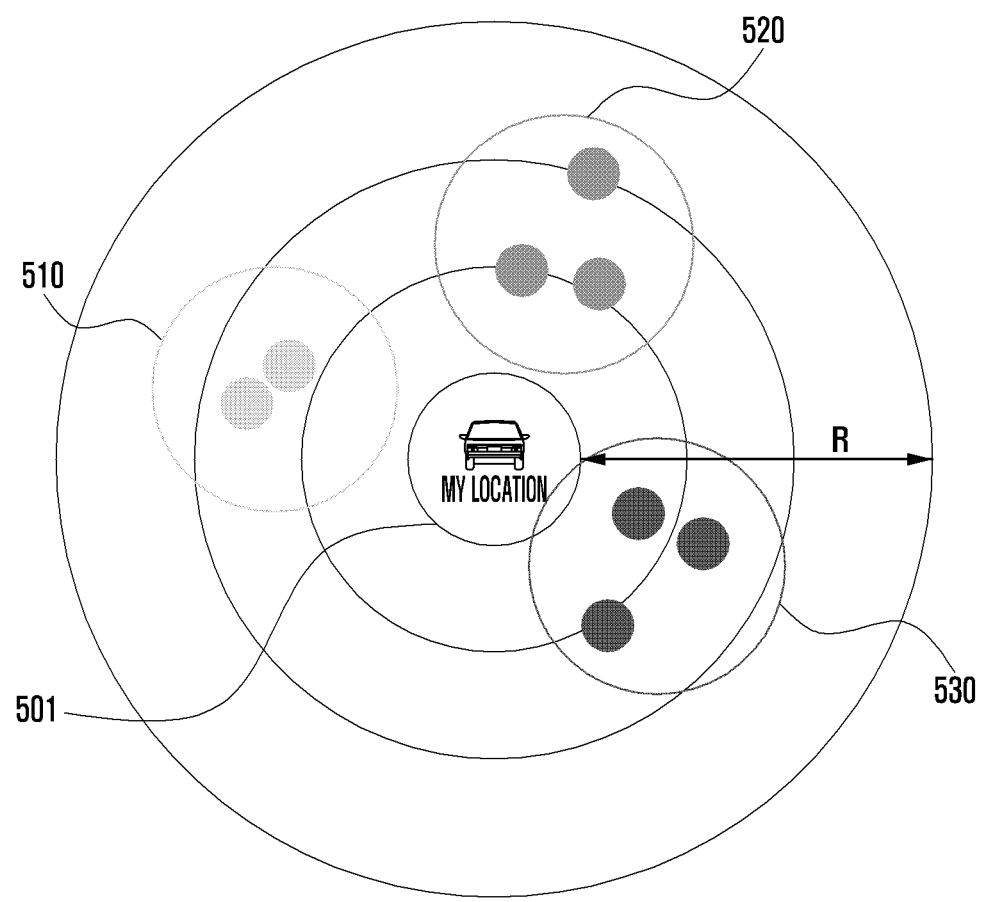
FIG. 5A is a diagram illustrating an example method of generating a group according to various embodiments.
Figure 5C:
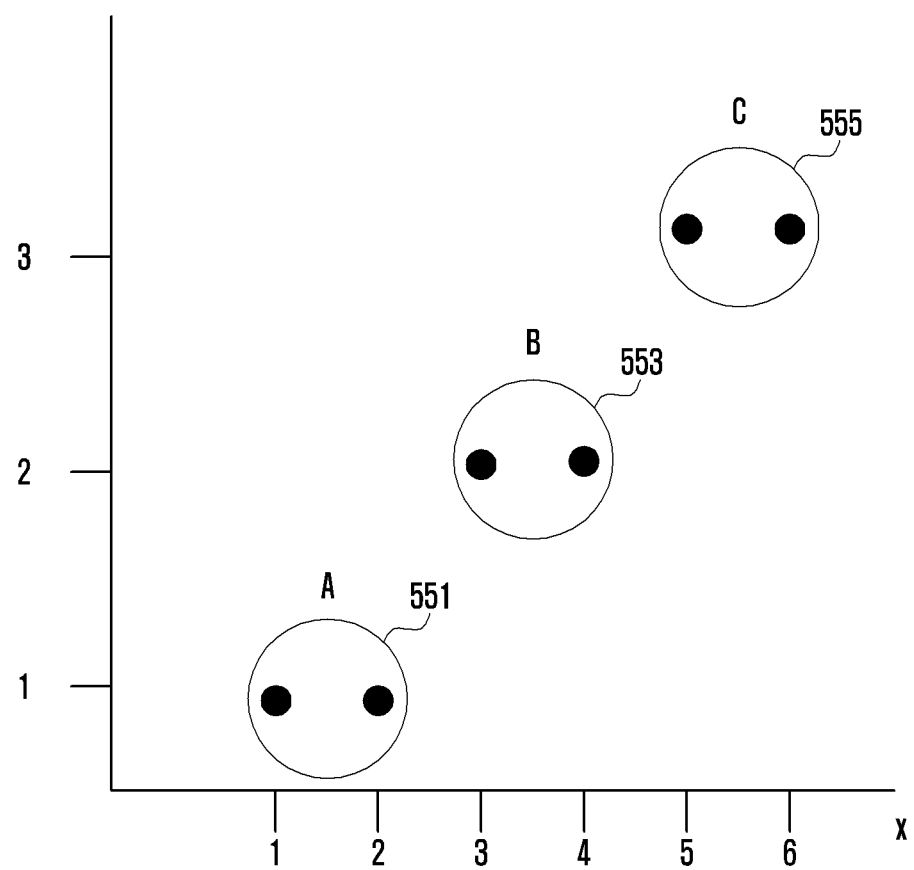
FIG. 5C is a diagram illustrating an example method of generating a group according to various embodiments.

FIG. 5A is a diagram illustrating an example method of generating a group according to various embodiments, FIG. 5B is a diagram illustrating an example method of generating a group according to various embodiments, and FIG. 5C is a diagram illustrating an example method of generating a group according to various embodiments.

Referring to FIG. 5A, a vehicle 501 (e.g., the electronic device 101 in FIG. 1) to which the V2X technology has been applied may communicate with an external electronic device (e.g., an electronic device embedded in another vehicle, an electronic device embedded in a bicycle or an electronic device owned by a pedestrian) (e.g., the electronic device 104 in FIG. 1) located within a set range (e.g., the radius of curvature R) in a wired or wireless way, and may classify the external electronic device 104 as at least one group (e.g., a vehicle group 510, a bicycle group 520 or a pedestrian group 530). According to an example embodiment, the set range may be set based on an absolute value and reference value corresponding to the at least one group. The absolute value and reference value may be determined by a developer and a user. According to an example embodiment, the setting of a range corresponding to at least one group may be fixed or the range may be set based on a user's choice. According to an example embodiment, the external electronic device 104 may include an electronic device whose application related to the V2X technology has been enabled within a set range.

According to various embodiments, the vehicle 501 to which the V2X technology has been applied may obtain first information related to the vehicle 501. For example, the first information may include at least some of a latitude, longitude, heading, speed, acceleration, communication state, data transmission time and/or V2X data element corresponding to the vehicle 501.

According to various embodiments, the vehicle 501 to which the V2X technology has been applied may obtain second information related to the external electronic device 104 from the external electronic device 104. According to an example embodiment, the electronic device 101 and the external electronic device 104 may exchange data through wired communication or wireless communication, and may transmit and receive data to which the V2X technology has been applied. According to an example embodiment, the vehicle 501 may transmit the first information to the external electronic device 104. The vehicle 501 may obtain the second information from the external electronic device 104.

According to various embodiments, the vehicle 501 may generate at least one group based on the first information and the second information, and may classify at least one external electronic device for each group based on the generated group.

FIG. 5B is a diagram illustrating an example process of obtaining first information 541 corresponding to the vehicle 501 to which the V2X technology has been applied and second information 543 corresponding to another vehicle (e.g., the external electronic device 104) and calculating a relative difference between the first information 541 and the second information 543.

Referring to FIG. 5B, the first information 541 may include at least some of identification (ID) information, location information (e.g., latitude (lat), longitude (long), speed or heading corresponding to the vehicle 501. The second information 543 may include at least some of ID information, location information, speed or heading corresponding to another vehicle (e.g., the external electronic device 104). According to an example embodiment, the vehicle 501 may calculate a relative difference 545 between the first information and the second information, and may classify at least one group based on the calculated difference 545. For example, the difference 545 may be a reference value for classifying a group. According to an example embodiment, the difference 545 may be a relative numerical value, and may include at least some of a relative distance (e.g., a relative distance difference between the vehicle 501 and another vehicle), a relative velocity (e.g., a speed difference between the vehicle 501 and another vehicle), a relative acceleration (e.g., an acceleration difference between the vehicle 501 and another vehicle), the type, heading (e.g., moving direction) or status information (e.g., the number of passengers or information on a driver) of a vehicle.

FIG. 5C is a diagram illustrating an example process of generating at least one group based on the difference 545 calculated based on the first information 541 and the second information 543. For example, the difference 545 may include a relative numerical value difference between the vehicle 501 and another vehicle, a relative difference between distances, a relative difference between velocities, a relative difference between accelerations, a difference between the types of vehicle, a relative difference between headings or a relative difference between pieces of status information. According to an example embodiment, the vehicle 501 may identify criterion information for classifying at least one group (e.g., classify a group based on a speed difference, classify a group based on a distance difference or classify a group based on heading) based on the difference 545. The vehicle 501 may identify criterion information, and may identify at least one group corresponding to the criterion information. For example, for the at least one group, an absolute reference value (e.g., a value "K") and a range value (e.g., a value "a") may be set based on a set range in accordance with criterion information. For example, if at least one group is classified based on a "speed difference", an absolute reference value (e.g., a value "K") may be 10 km. If an absolute reference value is 10 km and a range value (e.g., a value "a") is 10, a relative velocity difference between at least one group and the vehicle 501 may be divided into within 10 km, within 10~20 km, and within 20~30 km. According to an example embodiment, an absolute reference value (e.g., a value "K") and a range value (e.g., a value "a") may be changed and adjusted by a developer and a user.

Referring to FIG. 5C, a group may be classified as at least one group (e.g., a group A 551, a group B 553 and a group C 555) based on an absolute reference value (e.g., a value "K") and a range value (e.g., a value "a"). For example, the group A 551 may include one vehicle (x=1) and two vehicles (x=2). The group B 553 may include three vehicles (x=3) and four vehicles (x=4). The group C 555 may include five vehicles (x=5) and six vehicles (x=6). For example, a relative velocity difference between the vehicle 501 and another vehicle may be identified as criterion information. The speed of the vehicle 501 may be 60 km. An absolute reference value (e.g., a value "K") may be set to 10, and a range value (e.g., a value "a") may be set to 10. Table 1 illustrates a process of classifying another vehicle as at least one group when the speed of the vehicle 501 is 60 km.

TABLE 1

| ID | SPEED | REPRESENTATIVE VALUE | GROUP SECTION | GROUP |
|---|---|---|---|---|
| 1 | 60 | 5 | k~k + 10 | group A |
| 2 | 67 | 5 | k~k + 10 | group A |
| 3 | 76 | 15 | k + 10~k + 20 | group B |
| 4 | 71 | 15 | k + 10~k + 20 | group B |
| 5 | 81 | 25 | k + 20~k + 30 | group C |
| 6 | 84 | 25 | k + 20~k + 30 | group C |

Referring to Table 1, a group (e.g., group A, group B or group C) may be classified based on an absolute reference value and a range value. A representative value (e.g., a middle value of a section for classifying a group) may be calculated based on the absolute reference value and the range value. For example, the representative value may be "(k+k+10)/2=representative value" if group section is (k~k+ 10) (in the case of the group A). According to an example embodiment, a representative value corresponding to each group and a relative difference (e.g., a speed difference) between the vehicle 501 and another vehicle may be measured. At least one different vehicle may be grouped based on the measured representative value and the relative difference. Referring to Table 1, the vehicle 501 may classify another vehicle as one group based on a relative velocity difference between the vehicle 501 and another vehicle. For example, in Table 1, vehicles (e.g., two vehicles (x=2)) whose ID (e.g., an X-axis value in FIG. 5C) corresponds to 2 may move at the speed of about 67 km, and a representative value may be 5. A relative velocity difference between the vehicle 501 and the two vehicles (x=2) may be about 7 km because the speed of the vehicle 501 is about 60 km. The two vehicles (x=2) may be classified as the group A, that is, a group corresponding to a representative value (5) closest to the measured difference (7 km). The two vehicles having an ID corresponding to 2 may be classified as the group A. According to various embodiments, the vehicle 501 may measure a representative value and a difference, and may classify another vehicle as at least one group based on the representative value and the difference.

Referring to FIG. 5C, a group may be classified as the group A 551, the group B 553 or the group C 555. At least one different vehicle may be classified as one group. According to various embodiments, criterion information for classifying a group is not limited to a moving speed, and may be set based on a difference between the relative distances of vehicles or a difference between the relative headings of vehicles.

Figure 6A:
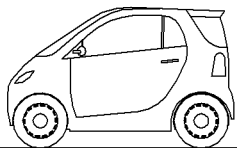
FIG. 6A is a diagram illustrating example criterion for generating a group according to various embodiments.
Figure 6B:
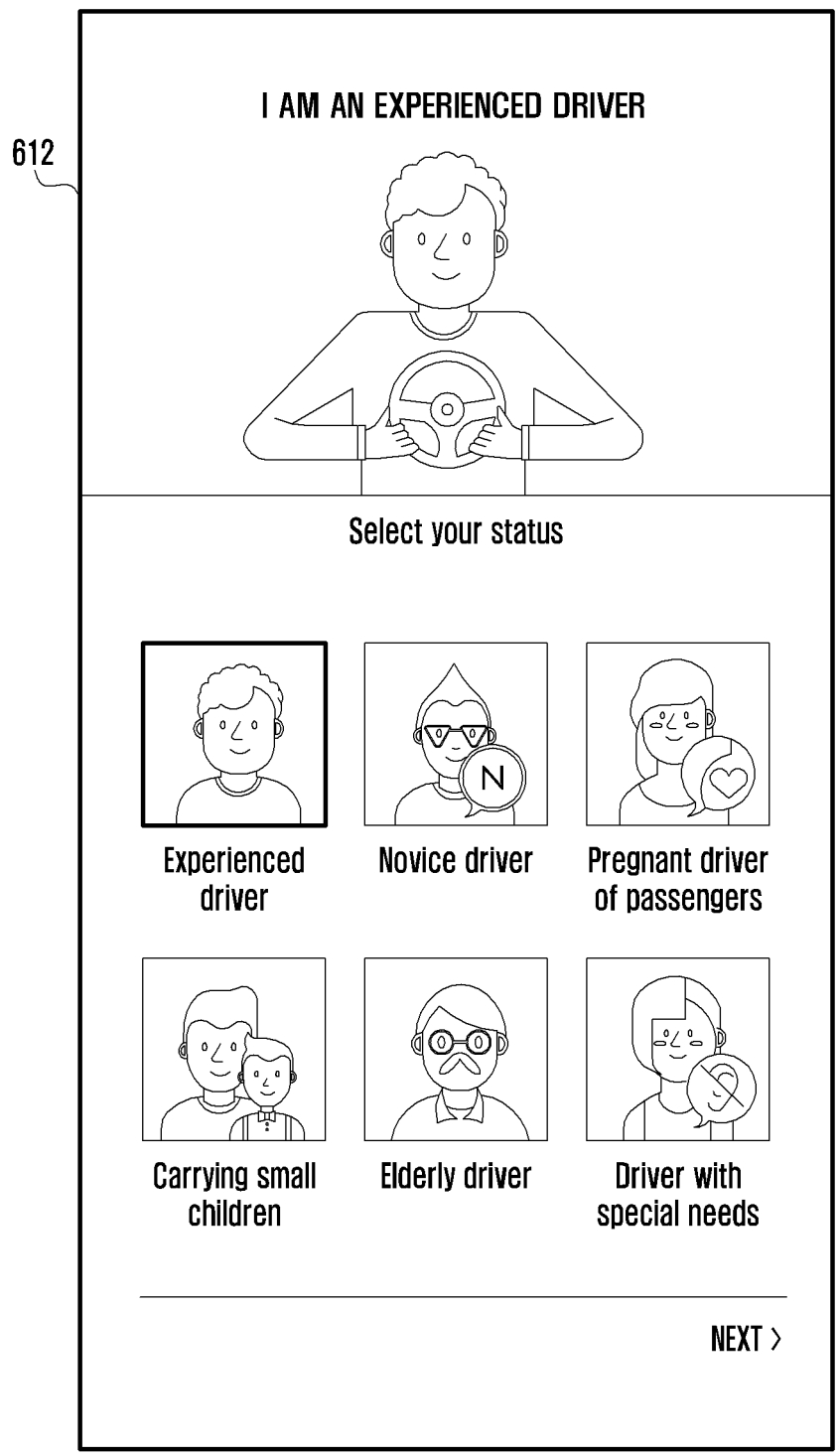
FIG. 6B is a diagram illustrating example criterion for generating a group according to various embodiments.

FIG. 6A is a diagram illustrating example criterion for generating a group according to various embodiments, and FIG. 6B is a diagram illustrating example criterion for generating a group according to various embodiments.

FIG. 6A illustrates an example user interface 611 for configuring information on the electronic device 101 in an electronic device (e.g., the electronic device 101 in FIG. 1) to which the V2X technology has been applied. According to an example embodiment, the electronic device 101 may be an electronic device embedded in a vehicle. A user may configure data related to a vehicle, such as the type, size or registration number of a vehicle.

According to various embodiments, the electronic device 101 may communicate with an external electronic device (e.g., the electronic device 104 in FIG. 1) in a wired or wireless way, and may exchange information on a vehicle with the external electronic device. According to an example embodiment, regarding the electronic device 101, the size of a vehicle may be assigned to a data element value as V2X-related information depending on a user's choice. The electronic device 101 may group the external electronic device 104 based on the size of the vehicle, and may calculate a representative value of the group corresponding to the size of the electronic device 101. The electronic device 101 may search for a value most approximate or closest to a representative value corresponding to each group based on the calculated representative value, and may identify a group corresponding to the most proximate or closest value. For example, the electronic device 101 may identify a group based on a higher value if any one of the length, width or height of a vehicle exceeds a reference value.

FIG. 6B illustrates an example user interface 612 for configuring information on a user who uses the electronic device 101 in an electronic device (e.g., the electronic device 101 in FIG. 1) to which the V2X technology has been applied. According to an example embodiment, the electronic device 101 may be an electronic device embedded in a vehicle. A user who uses the electronic device 101 may be a driver. The electronic device 101 may store information (e.g., an inexperienced driver, a novice driver, a pregnant woman or a child on board) on a driver and a passenger.

According to various embodiments, the electronic device 101 may communicate with an external electronic device (e.g., the electronic device 104 in FIG. 1) in a wired or wireless way, and may exchange information on a driver and a passenger with the external electronic device 104. According to an example embodiment, the electronic device 101 may group the external electronic device 104 based on driver information. For example, the electronic device 101 may generate at least one group based on status information (e.g., state value) for at least one external electronic device 104, and may group the external electronic device 104 based on the generated at least one group. According to an example embodiment, the electronic device 101 and the external electronic device 104 may exchange group messages. The group message may include a group message ID and a group member list (e.g., unique information) included in a group.

The electronic device 101 may identify at least one group to which the electronic device 101 belongs based on the group message. According to an example embodiment, the electronic device 101 may transmit a group message according to a broadcasting method, may select a group message transmitted by the external electronic device 104 based on a group to which the electronic device 101 belongs, and may obtain the selected group message.

According to various embodiments, the electronic device 101 may withdraw from a corresponding group if it does not want to receive a group message from the external electronic device 104. For example, the electronic device 101 may configure a group message to be not received or may withdraw from a given group so that a group message is not received from only the given group. If a group message is received from the external electronic device 104, the electronic device 101 may perform a process of making a withdrawal request for withdrawing from a group related to the group message or filtering out the group message so that the group message is not received.

According to an example embodiment, if the reception of a message from a given group is refused, the electronic device 101 may delete a given group from a group list to which the electronic device 101 belongs. According to an example embodiment, the electronic device 101 may block the reception of a group message by filtering out the group message generated by a given group. Furthermore, the electronic device 101 may disable a V2X program or delete information classified as a given group through a V2X program. According to an example embodiment, if the number of electronic devices belonging to a V2X group is 2 or less, the V2X group may be automatically removed.

Figure 7A:
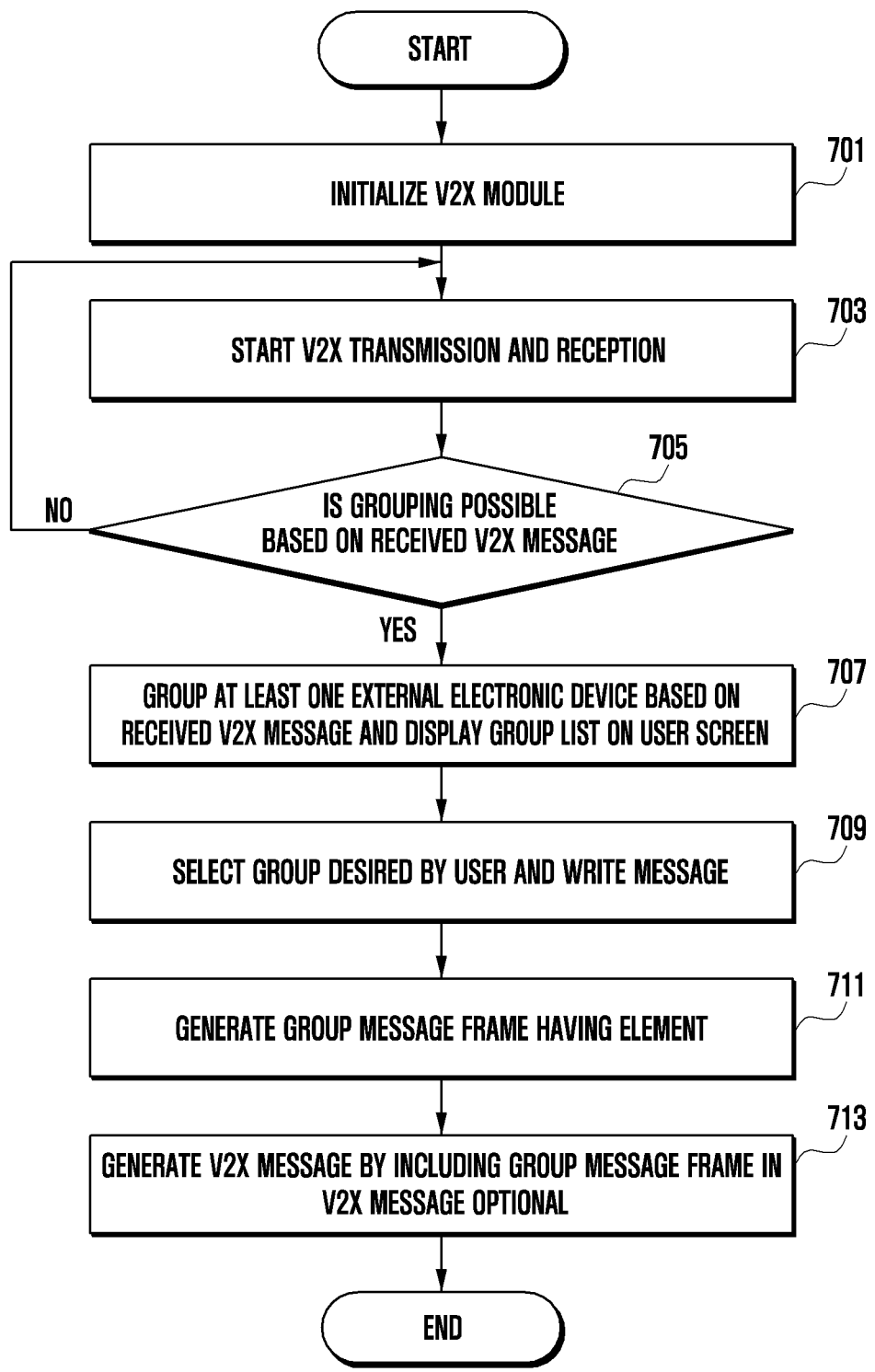
FIG. 7A is a flowchart illustrating an example method of transmitting a group message according to various embodiments.
Figure 7B:
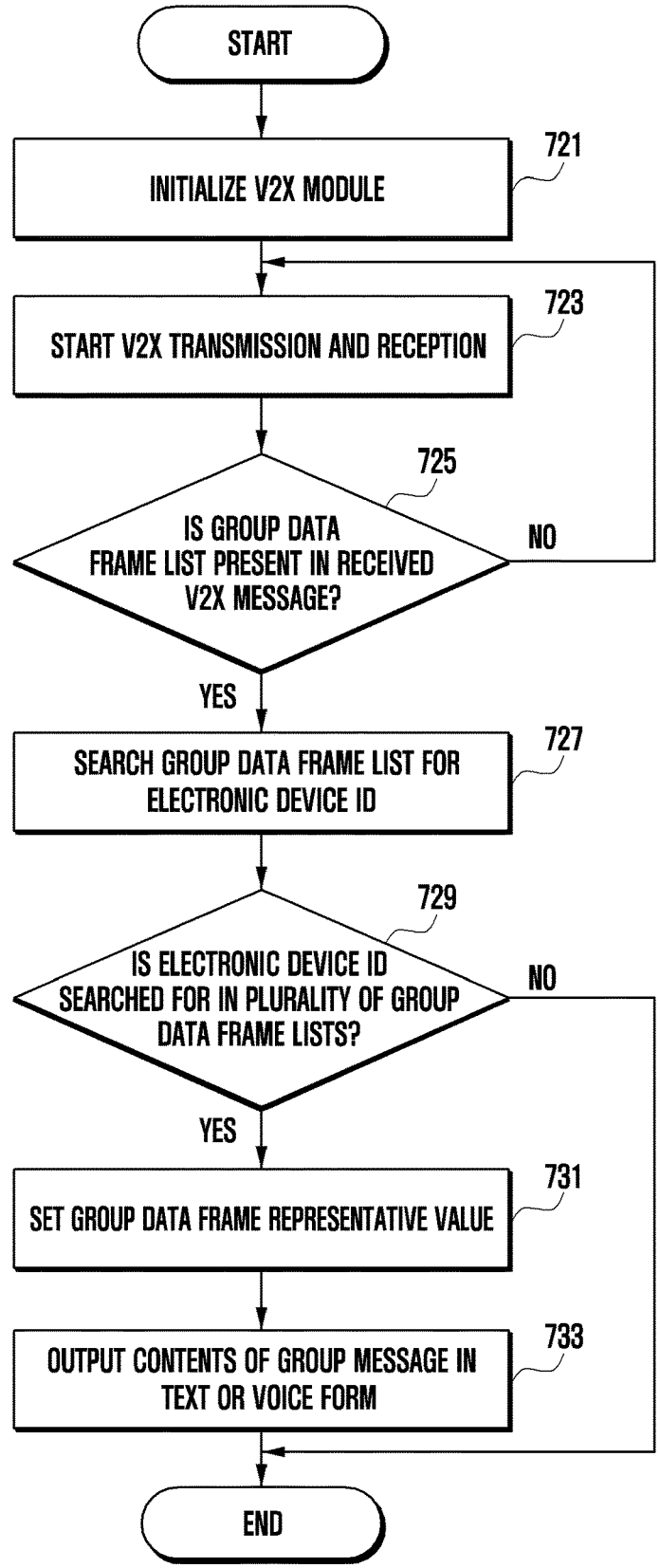
FIG. 7B is a flowchart illustrating an example method of transmitting a group message according to various embodiments.
Figure 7C:
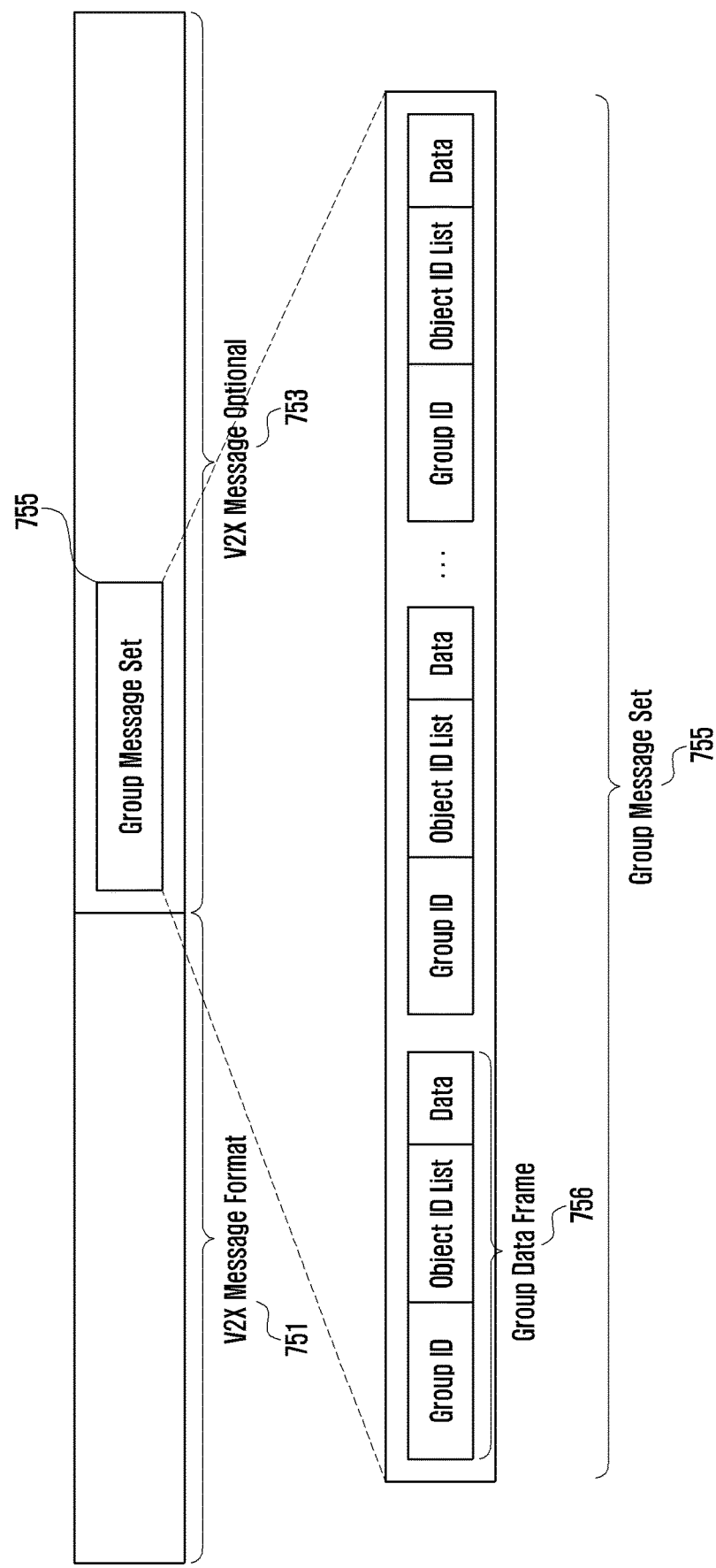
FIG. 7C is a diagram illustrating an example format of a group message according to various embodiments.

FIG. 7A is a flowchart illustrating an example method of transmitting a group message according to various embodiments, FIG. 7B is a flowchart illustrating an example method of transmitting a group message according to various embodiments, and FIG. 7C is a diagram illustrating an example format of a group message according to various embodiments.

FIG. 7A is a flowchart illustrating an example method for an electronic device (e.g., the electronic device 101 in FIG. 1) to transmit a group message to at least one external electronic device (e.g., the electronic device 104 in FIG. 1). Referring to FIG. 7A, at operation 701, the electronic device 101 may initialize a V2X module. For example, the V2X module may be an element of the electronic device 101 for applying the V2X technology. The electronic device 101 may initialize the V2X module for the application of the V2X technology.

At operation 703, the electronic device 101 may start V2X transmission and reception. For example, the electronic device 101 may execute or enable a V2X program (e.g., application) for the application of the V2X technology. The electronic device 101 may execute a V2X program for transmitting and receiving data based on the V2X technology. According to an example embodiment, the electronic device 101 may obtain data (e.g., a V2X message) from the external electronic device 104 and transmit data to the external electronic device 104. According to an example embodiment, the electronic device 101 may transmit data to at least one external electronic device 104 according to a broadcasting method.

At operation 705, the electronic device 101 may identify whether the external electronic device 104 can be grouped based on the received V2X message. For example, the electronic device 101 may obtain a V2X message from at least one external electronic device 104, and may perform grouping corresponding to common information based on the received V2X message. According to various embodiments, the electronic device 101 may perform grouping according to a condition if at least two of conditions, including a relative data difference calculated based on a first V2X message autonomously obtained with respect to the electronic device 101 and a second V2X message obtained from the external electronic device 104, a value K, that is, an absolute value related to the V2X technology, or a range value "a", are satisfied. According to an example embodiment, the electronic device 101 and the external electronic device 104 may perform groupings, respectively, or may perform groupings of different forms based on the state of the external electronic device 104 that has transmitted a V2X message.

At operation 705, if it is identified that grouping is possible, at operation 707, the electronic device 101 may group the at least one external electronic device 104 based on the received V2X message, and may display a group list on a user screen (e.g., the display 160 in FIG. 1). According to an example embodiment, the electronic device 101 may display a user interface for a V2X program on a screen. A group list may be displayed through the user interface. For example, the electronic device 101 may display a group list including at least one group so that a user can select a desired group.

At operation 709, the electronic device 101 may select a group desired by a user and write a message. For example, the electronic device 101 may receive a user input for a group list, may identify a group corresponding to the user input, and may write a message corresponding to the identified group. According to an example embodiment, the message corresponding to the group may be a message stored in a memory (e.g., the memory 130 in FIG. 1) or may be a message directly written by a user. According to an example embodiment, the message may be written using a keyboard, voice or text by a user.

At operation 711, the electronic device 101 may generate a group message frame having an element, such as a group ID, an object list or data. According to an example embodiment, data according to the V2X technology may be generated based on a configured format, and may include a frame of a message form.

At operation 713, the electronic device 101 may generate a V2X message by including the generated group message frame in V2X message optional. For example, the V2X message may include a group message frame and V2X message optional, and may be generated in a format for exchanging information with the external electronic device 104. A process of generating the group message frame is described in greater detail below with reference to FIG. 7C.

FIG. 7B is a flowchart illustrating an example method for an electronic device (e.g., the electronic device 101 in FIG. 1) to receive a group message from an external electronic device (e.g., the electronic device 104 in FIG. 1). Referring to FIG. 7B, at operation 721, the electronic device 101 may initialize a V2X module. At operation 723, the electronic device 101 may start V2X transmission and reception. In FIG. 7B, operation 721 and operation 723 may operate identically with or similarly to operation 701 and operation 703 in FIG. 7A.

At operation 725, the electronic device 101 may identify whether a group data frame list is present in the received V2X message. According to an example embodiment, the electronic device 101 may obtain a V2X message from the at least one external electronic device 104, and may identify whether a group data frame list is present based on the received V2X message.

At operation 725, if it is identified that the group data frame list is present, at operation 727, the electronic device 101 may search the group data frame list for its own (e.g., the electronic device 101) ID. For example, one or a plurality of IDs for the electronic device 101 may be searched for in the group data frame list.

At operation 729, the electronic device 101 may identify whether the ID is searched for in a plurality of group data frame lists. If it is identified that the ID is searched for in a plurality of group data frame lists at operation 729, at operation 731, the electronic device 101 may set a group data frame representative value. At operation 733, the electronic device 101 may output the contents of a group message, corresponding to the plurality of retrieved group data frame lists, in a text or voice form.

If it is identified that the ID is not searched for in a plurality of group data frame lists at operation 729, the electronic device 101 does not belong to the received V2X message, and the V2X message may be neglected.

FIG. 7C is a diagram illustrating an example format of a group message to which the V2X technology has been applied. Referring to FIG. 7C, the format 751 of a message (e.g., V2X message format) to which the V2X technology has been applied may be selectively combined with the configuration of V2X message optional 753, and may be converted into a group message format. According to an example embodiment, the format of a group message to which the V2X technology has been applied may include a V2X message format 751 and V2X message optional 753. The V2X message optional 753 may include the configuration of a group message set 755.

The group message set 755 may include at least one group data frame 756. The group data frame 756 may include a group ID, an object ID list and/or data. For example, the group ID is a unique ID value capable of identifying a group, and cannot have the same value. The object ID list may include a ID list for the external electronic device 104 belonging to a group. The data may include the contents of a group message. According to an example embodiment, the group data frame 756 may be configured and adjusted by a developer and a user, and may be a data set configured with the data elements of a group ID, an object ID list and/or data. According to various embodiments, if data (e.g., messages) to which the V2X technology has been applied is exchanged between the electronic device 101 and the external electronic device 104, the data may be exchanged based on the V2X message format 751. If grouped group messages are exchanged, they may be exchanged based on the group message set 755.

Figure 8A:
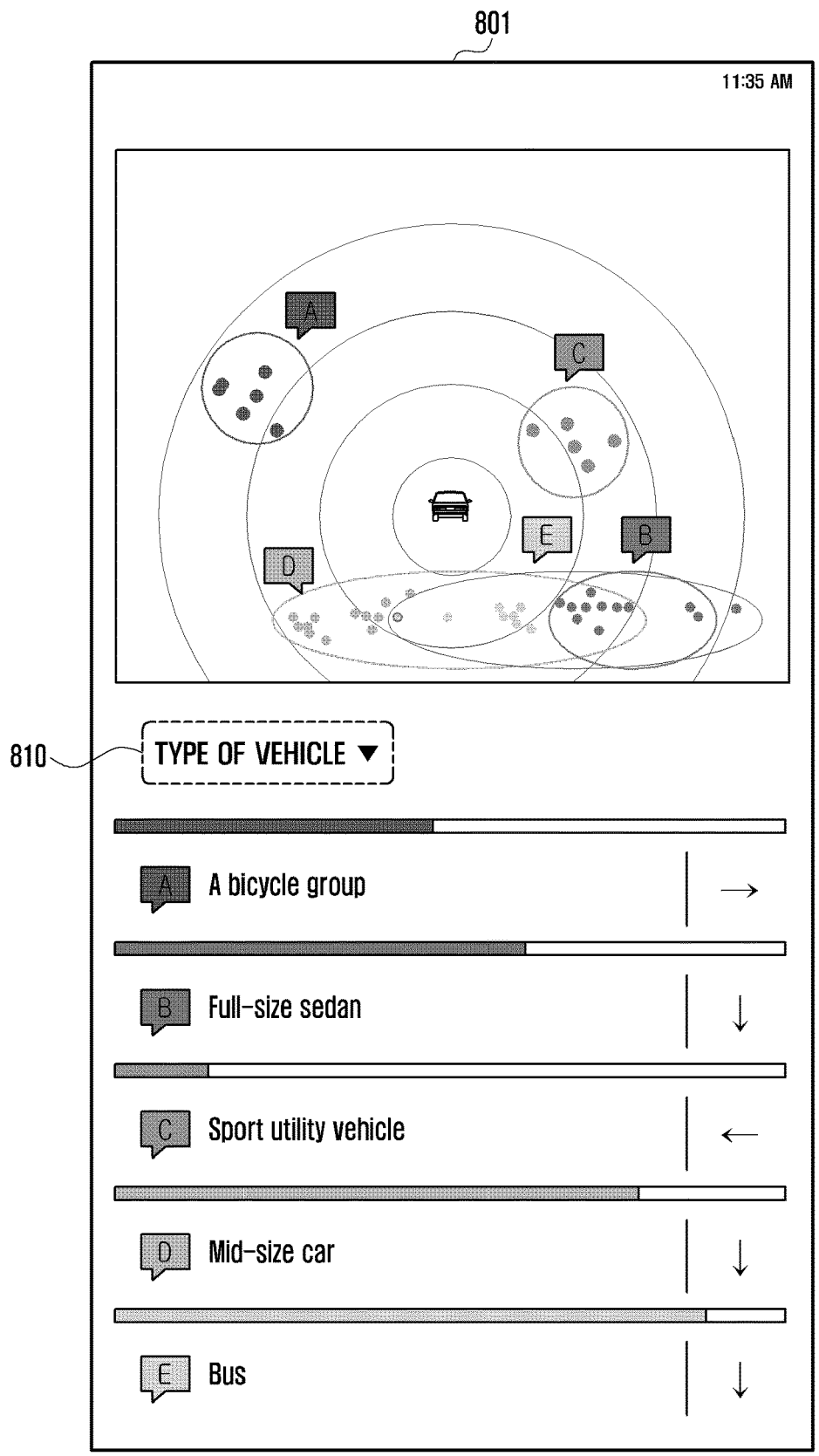
FIG. 8A is a diagram illustrating an example user interface related to the generation of a group according to various embodiments.
Figure 8B:
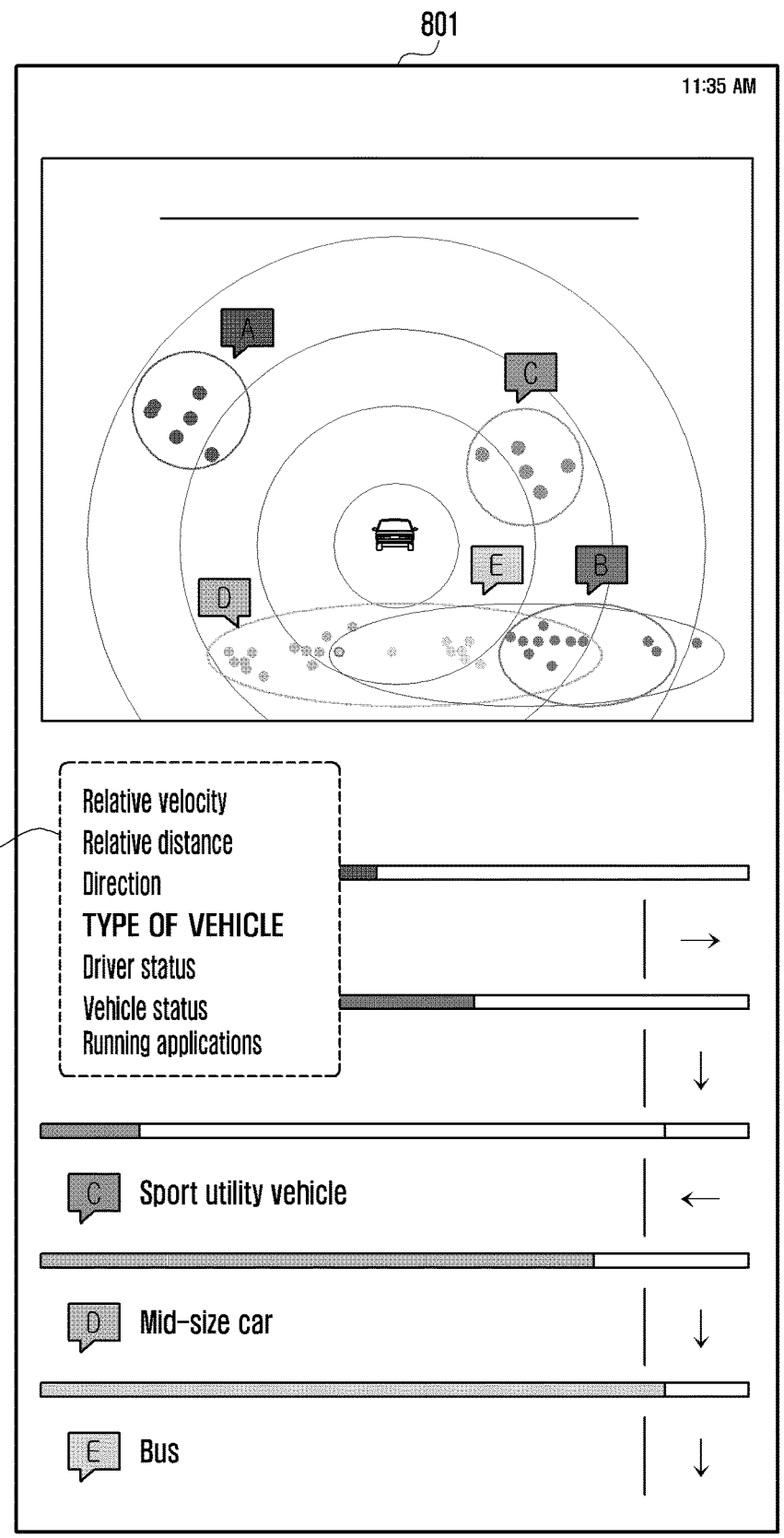
FIG. 8B is a diagram illustrating an example user interface related to the generation of a group according to various embodiments.

FIG. 8A is a diagram illustrating an example user interface related to the generation of a group according to various embodiments, and FIG. 8B is a diagram illustrating an example user interface related to the generation of a group according to various embodiments.

An electronic device (e.g., the electronic device 101 in FIG. 1) may be grouped for the application of the V2X technology. A grouping target may be changed or adjusted based on criterion information. The electronic device 101 may display, on a screen (e.g., the display 160 in FIG. 1), a user interface 801 in which a grouping target is changed based on criterion information. According to an example embodiment, the electronic device 101 may exchange information related to the V2X technology with an external electronic device (e.g., the electronic device 104 in FIG. 1).

The electronic device 101 may group the external electronic device 104 based on the exchanged information.

Referring to FIG. 8A, the electronic device 101 may group the external electronic device 104 based on the type of means of transportation (e.g., the type of vehicle). For example, grouping criterion information 810 may be configured by a user. A group to which the external electronic device 104 belongs may be changed based on the selection of the criterion information 810. In FIG. 8A, the user interface 801 may differently display a bicycle group A, a full-size sedan B, a sport utility vehicle (SUV) C and a mid-size car D among vehicles, or a bus group E based on the type of vehicle. According to an example embodiment, the electronic device 101 may select at least one of the classified groups, and may transmit and receive group messages based on the selected at least one group.

According to various embodiments, the electronic device 101 may generate at least one group in real time based on at least some of the speed of a vehicle, the size, location information, acceleration or driver status of a vehicle or the type of vehicle, and may display the generated at least one group through the user interface 801. The user interface 801 may differently display at least some of a color, size or interval in accordance with the generated at least one group so that the group is visually classified. The user interface 801 may display an exchange time when group messages may be exchanged using a graph of a bar form for each group. For example, the exchange time may be time when group messages may be transmitted and received between the electronic device 101 and at least one group. Each of the electronic device 101 and at least one group may be moving. For example, the faster the moving speed of each electronic device 101 is, the shorter the exchange time when group messages may be exchanged will be. According to an example embodiment, the electronic device 101 may transmit and receive group messages within a preset range, and may provide a user with the time when a group message corresponding to each group may be transmitted through the user interface 801. According to an example embodiment, the user interface 801 may also display an arrow icon indicative of heading for each group. According to various embodiments, the electronic device 101 may display a grouping state between the electronic device 101 and the external electronic device 104 and information on each group through the user interface 801. A user may intuitively identify the information based on the user interface 801.

Referring to FIG. 8B, the electronic device 101 may display grouping criterion information by listing the criterion information 811, and may change the criterion information in response to a user's choice input. According to an example embodiment, if grouping criterion information is changed, the user interface 801 may display the external electronic device 104 grouped in accordance with the changed criterion information. For example, the criterion information may include a relative velocity (e.g., the relative velocity of the external electronic device 104 based on the speed of the electronic device 101), a relative distance, a direction, the type of vehicle, a driver status, a vehicle status, and a running application. According to an example embodiment, the electronic device 101 may display the criterion information by listing the criterion information 811, and may select a given group generated based on the criterion information in response to a voice or a keyboard input. The electronic device 101 may provide a group message based on the selected given group, and may transmit the generated group message.

Figure 9B:
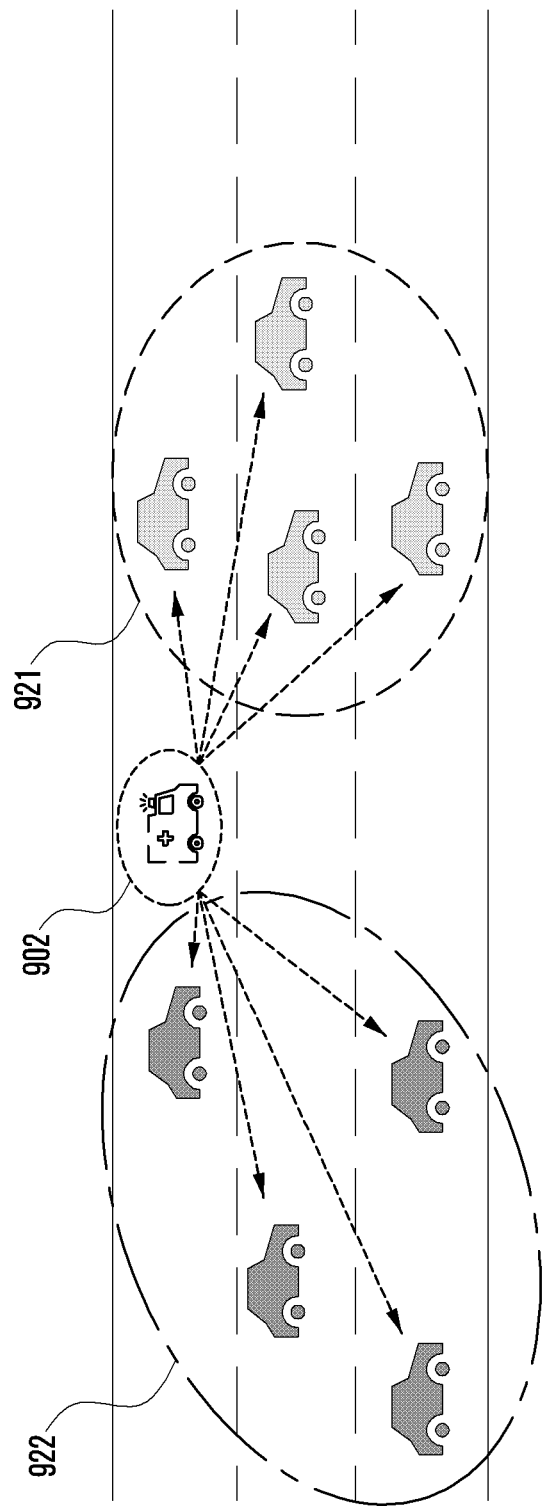
FIG. 9B is a diagram illustrating an example method of generating a group based on a given criterion according to various embodiments.
Figure 9C:
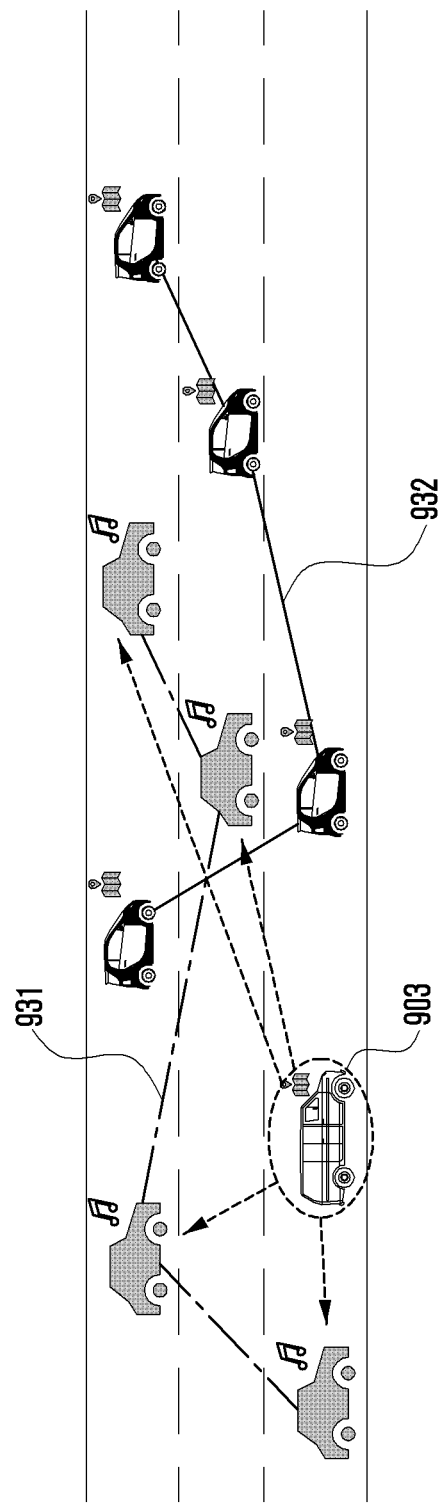
FIG. 9C is a diagram illustrating an example method of generating a group based on a given criterion according to various embodiments.

FIG. 9A is a diagram illustrating an example method of generating a group based on a given criterion according to various embodiments, FIG. 9B is a diagram illustrating an example method of generating a group based on a given criterion according to various embodiments, and FIG. 9C is a diagram illustrating an example method of generating a group based on a given criterion according to various embodiments.

Referring to FIG. 9A, an electronic device 901 (e.g., the electronic device 101 in FIG. 1) may be a running vehicle. The electronic device 901 may exchange information (e.g., messages) related to the V2X technology with an external electronic device (e.g., the electronic device 104 in FIG. 1, an electronic device embedded in another vehicle, an electronic device embedded in a bicycle or an electronic device owned by a pedestrian) through communication. The electronic device 901 may generate at least one group based on information received from the external electronic device 104. For example, the electronic device 901 may classify the external electronic device 104 as a vehicle group 912, a bicycle group 911 or a pedestrian group 913. According to an example embodiment, the electronic device 901 may select a given group, and may transmit a group message to the external electronic device 104 belonging to the selected group.

For example, the electronic device 901 may transmit a group message to the bicycle group 911 so that a bicycle runs on a bicycle driveway 905. The electronic device 901 may generate a group message reading that "run on a bicycle driveway", and may transmit the group message to the bicycle group 911. The group message may have been previously stored in a memory (e.g., the memory 130 in FIG. 1) of the electronic device 901 or may be written by a user of the electronic device 901.

Referring to FIG. 9B, an electronic device 902 (e.g., the electronic device 101 in FIG. 1) may be a running ambulance vehicle. The electronic device 902 may transmit a message related to the V2X technology through communication with an external electronic device (e.g., an electronic device embedded in another vehicle located ahead or an electronic device embedded in another vehicle located behind). The electronic device 902 may classify external electronic devices located nearby into a first vehicle group 921 located ahead and a second vehicle group 922 located behind based on the electronic device 902. According to an example embodiment, the electronic device 902 may select the first vehicle group 921 and transmit a group message to the selected first vehicle group 921.

For example, the electronic device 902 may transmit a group message to the first vehicle group 921 in order to rapidly remove a patient. The electronic device 902 may generate a group message reading that "the ambulance vehicle is running in the first lane", and may transmit the generated group message to the first vehicle group 921.

Referring to FIG. 9C, an electronic device 903 (e.g., the electronic device 101 in FIG. 1) may be one running vehicle. The electronic device 903 may transmit and receive messages related to the V2X technology through communication with an external electronic device (e.g., the electronic device 104 in FIG. 1). The electronic device 903 may classify external electronic devices 104 located nearby into a first vehicle group 931 in which a listening-to-music application is executing and a second vehicle group 932 in which a navigation application is executing. According to an example embodiment, the electronic device 903 may select the first vehicle group 931 and transmit a group message to the selected first vehicle group 931 or may obtain a group message from the selected first vehicle group 931.

For example, the electronic device 903 may share a listening music list with the first vehicle group 931. According to an example embodiment, if the second vehicle group 932 in which the navigation application is executing is selected, the electronic device 903 may share information related to a surrounding traffic condition (e.g., an accident situation or a traffic control condition) with the second vehicle group 932.

According to various embodiments, the electronic device 903 may designate a given group including at least one external electronic device, and may transmit a given message to at least one external electronic device included in the given group.

Figure 10:
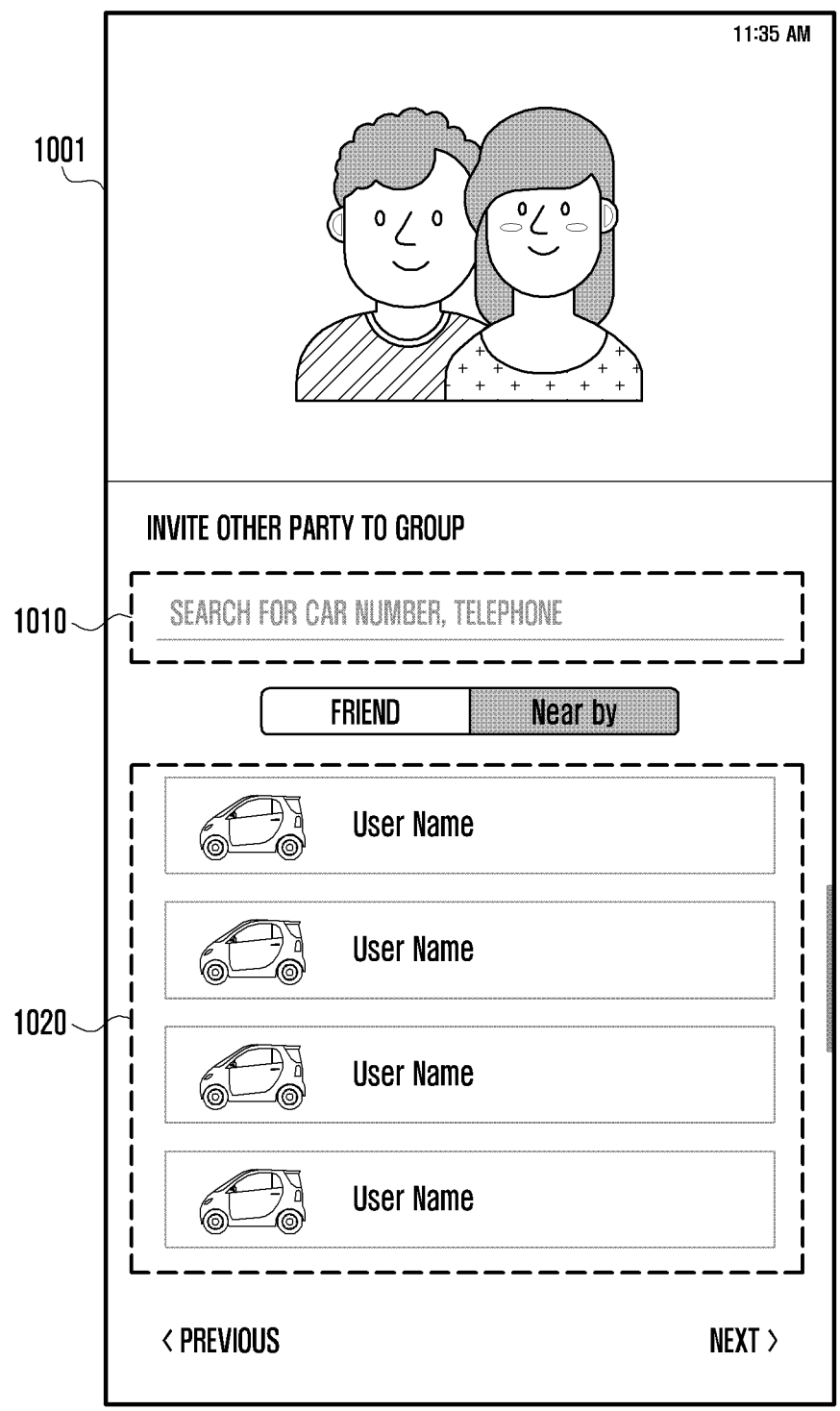
FIG. 10 is a diagram illustrating an example method of inviting an external electronic device to a group according to various embodiments.

FIG. 10 is a diagram illustrating an example method of inviting an external electronic device to a group according to various embodiments.

Referring to FIG. 10, an electronic device (e.g., the electronic device 101 in FIG. 1) may invite the other party (e.g., friend) to a given group using information on the other party who owns an external electronic device (e.g., the electronic device 102 or 104 in FIG. 1). For example, the electronic device 101 may search for the other party stored in a memory (e.g., the memory 130 in FIG. 1) using the telephone number or car number of the other party, and may invite the retrieved other party to a given group. According to various embodiments, the electronic device 101 may display a user interface 1001 for searching for at least one other party. The user interface 1001 may include a search box 1010 for searching for at least one other party and a result box 1020 for displaying a search result list. According to an example embodiment, the electronic device 101 may search for at least one other party based on information stored in the memory 130 in response to an input to the search box 1010, and may display information of the retrieved other party through the result box 1020.

According to various embodiments, the electronic device 101 may search for at least one external electronic device located within a set range (e.g., V2X communication arrival range, about a radius of 1 km), may select at least some of the retrieved at least one external electronic device, and may invite the selected external electronic device to a group.

According to various embodiments, if a group is a group generated by a user's choice or a group toward the same destination, the electronic device 101 may change a method from a broadcast method to a TCP/IP method, and may continue to transmit a group message based on a set range (e.g., V2X communication arrival range, a radius of 1 km).

According to various example embodiments of the disclosure, a grouping method may include obtaining first information including information on an electronic device (e.g., the electronic device 101 in FIG. 1) obtained through a sensor (e.g., the sensor module 176 in FIG. 1) and information on the user of the electronic device 101, receiving second information for at least one external electronic device (e.g., the electronic device 102 or 104 in FIG. 1, the external electronic device 350 in FIG. 3) from the at least one external electronic device through wireless communication circuitry (e.g., the communication module 190 in FIG. 3) of the electronic device, generating at least one group according to at least one piece of criterion information based on the obtained first information and second information, and may group the at least one external electronic device based on the generated at least one group.

According to an example embodiment, the electronic device and the at least one external electronic device may be connected using the wireless communication circuitry based on the V2X technology, and may exchange information related to the V2X technology.

According to an example embodiment, the at least one piece of criterion information may include at least one of a relative distance, a relative velocity or a relative acceleration between the electronic device and the at least one external electronic device, and may further include at least one of the type, moving direction or status information of a vehicle corresponding to at least one of the electronic device or the at least one external electronic device.

According to an example embodiment, the information on the electronic device may include at least one piece of information of the type, location, speed, acceleration, size or communication state of a vehicle corresponding to the electronic device. Information on the user of the electronic device may include at least one piece of information of the age, sex or driving experience of a driver or information of a fellow passenger who is in the vehicle.

According to an example embodiment, a user interface, including at least one of the at least one piece of criterion information, information on the generated at least one group or information on the at least one external electronic device included in the at least one group, may be displayed on the display. A user input for selecting at least one of the at least one group may be detected through the user interface. At least one message may be transmitted to the selected group in response to the detected user input.

According to an example embodiment, an operation of transmitting at least one message to the at least one group may include an operation of generating the at least one message based on a message format based on the V2X technology and transmitting the generated at least one message to the at least one external electronic device included in the selected group.

A method according to an example embodiment may include searching for at least one external electronic device to be invited to the at least one group and transmitting the at least one message for inviting at least some of the retrieved at least one external electronic device to the at least one group.

According to various embodiments of the disclosure, an electronic device (e.g., vehicle) can perform wireless networking (e.g., wireless communication based on the V2X technology) with at least one external electronic device, and can generate or dissolve at least one group (e.g., a group based on the V2X technology) based on the state of the external electronic device. The electronic device can efficiently transmit a group message in accordance with generated at least one group.

An electronic device according to various embodiments can select or directly designate a given group based on generated at least one group, and can perform communication with the given group in real time. In addition, various effects obtained through this document directly or indirectly may be provided.

While the disclosure has been illustrated and described with reference to various example embodiments, it should be understood that the various example embodiments are intended to be illustrative, not limiting. One of ordinary skill in the art will understand and appreciate that various changes in form and detail may be made without departing from the spirit and scope of the disclosure, including the appended claims and equivalents thereof.

What is claimed is:

1. An electronic device comprising:
   wireless communication circuitry configured to perform wireless communication with at least one external electronic device;
   a sensor configured to obtain information related to the electronic device;
   a processor operatively coupled to the wireless communication circuitry and the sensor; and
   a memory operatively coupled to the processor,
   wherein the memory is configured to store instructions, which upon execution, enable the processor to control the electronic device to:
   obtain first information comprising information obtained through the sensor and information on a user of the electronic device,
   obtain second information for the at least one external electronic device from the at least one external electronic device through the wireless communication circuitry,
   generate at least one group based on the obtained first information and the obtained second information, wherein generating the at least one group includes identifying at least one piece of criterion information that is satisfied by the at least one external electronic device, and
   group the at least one external electronic device based on the generated at least one group.

2. The electronic device of claim 1, wherein the instructions, upon execution, enable the processor to control the electronic device to:
   connect to the at least one external electronic device using the wireless communication circuitry based on a vehicle to everything (V2X) technology, and
   exchange information related to the V2X technology with the at least one external electronic device.

3. The electronic device of claim 1, wherein the at least one piece of criterion information comprises at least one of a relative distance, relative velocity or relative acceleration between the electronic device and the at least one external electronic device and further comprises at least one of a type, heading or status information of a vehicle corresponding to at least one of the electronic device or the at least one external electronic device.

4. The electronic device of claim 1,
   wherein the information obtained through the sensor comprises at least one of a type, location, speed, acceleration, size or communication state of a vehicle corresponding to the electronic device, and
   wherein the information on the user of the electronic device comprises at least one of an age, sex, driving experience or information of a fellow passenger of a driver.

5. The electronic device of claim 1, further comprising a display operatively coupled to the processor,
   wherein the instructions, upon execution, enable the processor to control the electronic device to display, on the display, a user interface comprising at least one of the at least one piece of criterion information, information on the generated at least one group or information on the at least one external electronic device included in the at least one group.

6. The electronic device of claim 5, wherein the instructions, upon execution, enable the processor to control the electronic device to:
   detect an input to select one of the at least one group through the user interface, and
   transmit at least one message to the selected group in response to the detected input.

7. The electronic device of claim 6, wherein the instructions, upon execution, enable the processor to control the electronic device to:
   generate the at least one message based on a message format based on a vehicle to everything (V2X) technology, and
   transmit the at least one message to the at least one external electronic device included in the selected group.

8. The electronic device of claim 7, wherein the message format based on the V2X technology includes a group message frame comprising at least one of a group ID, an object ID list or data and a V2X message optional.

9. The electronic device of claim 6, wherein the at least one message comprises a message stored in the memory or comprises a message input through the user interface.

10. The electronic device of claim 6, wherein the instructions, upon execution, enable the processor to control the electronic device to:
    search for at least one external electronic device to be invited to the at least one group, and
    transmit at least one message for inviting at least some of the retrieved at least one external electronic device to the at least one group.

11. The electronic device of claim 1, wherein the instructions, upon execution, enable the processor to control the electronic device to:
    identify whether the generated at least one group includes a plurality of external electronic devices, and
    dissolve grouping of the at least one group based on a result of the identification.

12. An electronic device comprising:
    wireless communication circuitry configured to perform wireless communication with at least one external electronic device;
    a display;
    a processor operatively coupled to the wireless communication circuitry and the display; and
    a memory operatively coupled to the processor,
    wherein the memory is configured to store instructions, which upon execution, enable the processor to control the electronic device to:
    transmit, to the at least one external electronic device, information on a user stored in the memory using the wireless communication circuitry,
    obtain, from the at least one external electronic device, at least one group message based on a vehicle to everything (V2X) technology,
    identify whether the at least one external electronic device can be grouped into a group based on the obtained at least one group message, wherein the at least one external electronic device is determined to be able to be grouped into the group based on satisfying at least two conditions,
    group the at least one external electronic device into the group based on a result of the identification, and
    display a list of the group including the at least one external electronic device on the display.

13. The electronic device of claim 12, wherein the instructions, upon execution, enable the processor to control the electronic device to:
    detect a withdrawal input for withdrawing from the group corresponding to the obtained at least one group message, transmit a withdrawal request signal for withdrawing from the group based on the V2X technology in response to the withdrawal input, and
filter out a group message transmitted by the group.

14. A grouping method comprising:
obtaining first information comprising information on an electronic device obtained through a sensor and information on a user of the electronic device;
obtaining second information for at least one external electronic device from the at least one external electronic device through wireless communication circuitry of the electronic device;
generating at least one group based on the obtained first information and the obtained second information, wherein generating the at least one group includes identifying at least one piece of criterion information that is satisfied by the at least one external electronic device; and
grouping the at least one external electronic device based on the generated at least one group.

15. The grouping method of claim 14, further comprising:
connecting the electronic device and the at least one external electronic device using the wireless communication circuitry based on a vehicle to everything (V2X) technology; and
exchanging information related to the V2X technology between the electronic device and the at least one external electronic device.

16. The grouping method of claim 14, wherein the at least one piece of criterion information comprises at least one of a relative distance, relative velocity or relative acceleration between the electronic device and the at least one external electronic device and further comprises at least one of a type, heading or status information of a vehicle corresponding to at least one of the electronic device or the at least one external electronic device.

17. The grouping method of claim 14, wherein:
wherein the information on the electronic device comprises at least of a type, location, speed, acceleration, size or communication state of a vehicle corresponding to the electronic device, and
wherein the information on the user of the electronic device comprises at least one of an age, sex, driving experience or information of a fellow passenger of a driver.

18. The grouping method of claim 14, further comprising:
displaying, on a display, a user interface comprising at least one of the at least one piece of criterion information, information on the generated at least one group or information on the at least one external electronic device included in the at least one group;
detecting an input to select at least one group of the at least one group through the user interface; and
transmitting at least one message to the selected group in response to the detected input.

19. The grouping method of claim 18, wherein transmitting the at least one message to the at least one group comprises:
generating the at least one message based on a message format based on a vehicle to everything (V2X) technology; and
transmitting the generated at least one message to the at least one external electronic device included in the selected group.

20. The grouping method of claim 14, further comprising:
searching for at least one external electronic device to be invited to the at least one group; and
transmitting at least one message for inviting at least some of the retrieved at least one external electronic device to the at least one group.

* * * * *